United States Patent
Jafri

(10) Patent No.: US 11,507,895 B2
(45) Date of Patent: *Nov. 22, 2022

(54) OBTAINING SERVICES FROM PRODUCT PROVIDERS

(71) Applicant: Onriva, Inc., Foster City, CA (US)

(72) Inventor: Vajid Jafri, Redwood Shores, CA (US)

(73) Assignee: Onriva LLC, Foster City, CA (US)

(*) Notice: Subject to any disclaimer, the term of this patent is extended or adjusted under 35 U.S.C. 154(b) by 400 days.

This patent is subject to a terminal disclaimer.

(21) Appl. No.: 16/683,109

(22) Filed: Nov. 13, 2019

(65) Prior Publication Data

US 2020/0143297 A1    May 7, 2020

Related U.S. Application Data

(63) Continuation of application No. 15/276,447, filed on Sep. 26, 2016, now Pat. No. 10,510,023.

(60) Provisional application No. 62/233,209, filed on Sep. 25, 2015.

(51) Int. Cl.
| | |
|---|---|
| G06Q 10/02 | (2012.01) |
| G06Q 30/02 | (2012.01) |
| G06Q 30/06 | (2012.01) |
| G06Q 50/14 | (2012.01) |

(52) U.S. Cl.
CPC .......... *G06Q 10/02* (2013.01); *G06Q 10/025* (2013.01); *G06Q 30/0283* (2013.01); *G06Q 30/0601* (2013.01); *G06Q 30/0617* (2013.01); *G06Q 50/14* (2013.01)

(58) Field of Classification Search
CPC .. G06Q 10/02; G06Q 10/025; G06Q 30/0283; G06Q 30/0601; G06Q 30/0617; G06Q 50/14

USPC ............................................................ 705/5
See application file for complete search history.

(56) References Cited

U.S. PATENT DOCUMENTS

| | | | |
|---|---|---|---|
| 5,832,454 | A | 11/1998 | Jafri et al. |
| 2002/0059101 | A1* | 5/2002 | Ratliff ............... G06Q 30/06 705/14.1 |
| 2002/0072968 | A1 | 6/2002 | Gorelick et al. |
| 2003/0004760 | A1 | 1/2003 | Schiff et al. |
| 2003/0110063 | A1 | 6/2003 | Among et al. |
| 2003/0177045 | A1 | 9/2003 | Fitzgerald et al. |

(Continued)

FOREIGN PATENT DOCUMENTS

| | | |
|---|---|---|
| WO | WO 2000/05666 A1 | 2/2000 |
| WO | WO-0005666 A1 * 2/2000 | ........... G06Q 20/201 |
| WO | WO 2001/24043 A2 | 4/2001 |

OTHER PUBLICATIONS

Westermann, Dieter. "The potential impact of IATA's New Distribution Capability (NDC) on revenue management and pricing" file:///C:/Users/lma/Downloads/The_potential_impact_of_IATA's.pdf. Published online Sep. 6, 2013. (Year: 2013).*

(Continued)

*Primary Examiner* — Shannon S Campbell
*Assistant Examiner* — Lisa Ma
(74) *Attorney, Agent, or Firm* — Fenwick & West LLP

(57) ABSTRACT

Product providers offer matched prices for the products to the customers through a platform surveying the available prices from sale agents. The platform can determine lowest prices from the sale agents, and use this information to have an agreement with the product providers to sell the products at compatible prices.

20 Claims, 22 Drawing Sheets

(56) References Cited

U.S. PATENT DOCUMENTS

| | | | |
|---|---|---|---|
| 2004/0210513 A1* | 10/2004 | Harford | G06Q 10/02 705/37 |
| 2004/0249680 A1* | 12/2004 | Liew | G06Q 10/02 705/5 |
| 2005/0262065 A1* | 11/2005 | Barth | G06Q 40/04 |
| 2007/0239494 A1 | 10/2007 | Stephens et al. | |
| 2008/0004918 A1 | 1/2008 | Orttung et al. | |
| 2008/0010100 A1* | 1/2008 | Orttung | G06Q 30/02 705/5 |
| 2009/0076862 A1 | 3/2009 | Patoureaux et al. | |
| 2010/0010841 A1 | 1/2010 | Cooper et al. | |
| 2011/0029336 A1 | 2/2011 | Vieillard-Baron et al. | |
| 2011/0264501 A1 | 10/2011 | Clyne | |
| 2015/0134371 A1 | 5/2015 | Shivakumar et al. | |
| 2015/0339598 A1* | 11/2015 | Lulla | G06Q 30/0601 705/5 |
| 2016/0267400 A1 | 9/2016 | Clark | |
| 2017/0046732 A1 | 2/2017 | Elmachtoub et al. | |
| 2018/0288578 A1 | 10/2018 | Findlay | |

OTHER PUBLICATIONS

CarsDirect, https://techcrunch.com/2006/10/28/my-carsdirect-experience/ (Year: 2006).*

Borenstein, Severin. Rapid Communication and Price Fixing. http://faculty.haas.berkeley.edu/borenste/download/ATPCASE1.PDF (Year: 1997).*

Arrington, M., "My CarsDirect Experience," Tech Crunch, Oct. 28, 2006, 4 pages [Online] [Retrieved from the Internet Jun. 7, 2019] <URL: https://techcrunch.com/2006/10/28/my-carsdirect-experience/>.

Borenstein, S., "Rapid Communication and Price Fixing: The Airline Tariff Publishing Company Case," 1997, 17 pages [Online] [Retrieved from the Internet] <URL: http://faculty.haas/berkeley.edu/borenste/download/ATPCASE1.PDF>.

PCT International Search Report and Written Opinion for PCT/US2016/053780, dated Apr. 14, 2017, 18 Pages.

PCT Invitation to Pay Additional Fees and, Where Applicable, Protest Fee for PCT/US2016/053780, dated Nov. 10, 2016, 2 Pages.

IATA, "New Distribution Capability," Sep. 3, 2014, 1 page [Online] [Retrieved from the Internet] <URL: https://www.iata.org/whatwedo/airline-distribution/ndc/Pages/default.aspx>.

United States Office Action, U.S. Appl. No. 15/276,447, dated Aug. 28, 2018, 20 pages.

United States Office Action, U.S. Appl. No. 15/276,447, dated Jun. 12, 2019, 11 pages.

United States Office Action, U.S. Appl. No. 15/276,463, dated Jun. 12, 2020, ten pages.

United States Office Action, U.S. Appl. No. 15/276,463, dated Dec. 9, 2020, 12 pages.

* cited by examiner

```
┌─────────────────────────────────────────────┐
│ Contacting agents of a product provider to  │
│         obtain a first price of a product    │
│                      300                     │
└─────────────────────────────────────────────┘
                      │
                      ▼
┌─────────────────────────────────────────────┐
│  Negotiating with the product provider to    │
│  obtain a second price less than a full      │
│  price from the product provider based       │
│             on the first price               │
│                      310                     │
└─────────────────────────────────────────────┘
```

FIG. 3A

```
┌─────────────────────────────────────────────┐
│ Providing a product provider, wherein the    │
│ product comprises a service or a usage of    │
│ an instrument or a facility, wherein the     │
│ product provider performs the service or     │
│ operates the instrument or the facility,     │
│ wherein the product provider directly sells  │
│ the product, wherein the product provider    │
│ also uses sale agents for selling the        │
│                  products                    │
│                      330                     │
└─────────────────────────────────────────────┘
                      │
                      ▼
┌─────────────────────────────────────────────┐
│ Contacting the sale agents to obtain a       │
│ first price of the product offered by the    │
│                 sale agents                  │
│                      340                     │
└─────────────────────────────────────────────┘
                      │
                      ▼
┌─────────────────────────────────────────────┐
│ If the first price offered by the sale       │
│ agents is less than a second price offered   │
│ by the product provider, contacting the      │
│ product provider to obtain a third price     │
│ from the product provider that is less       │
│            than the second price             │
│                      350                     │
└─────────────────────────────────────────────┘
```

FIG. 3B

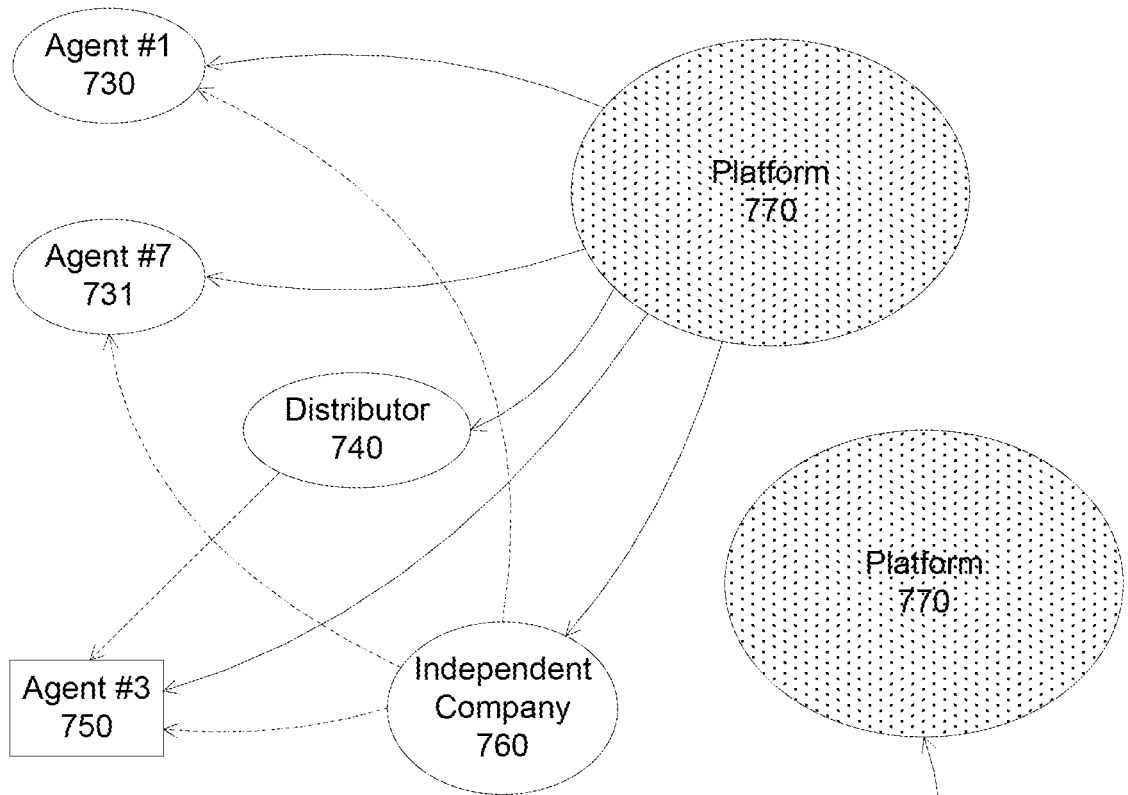
FIG. 7B
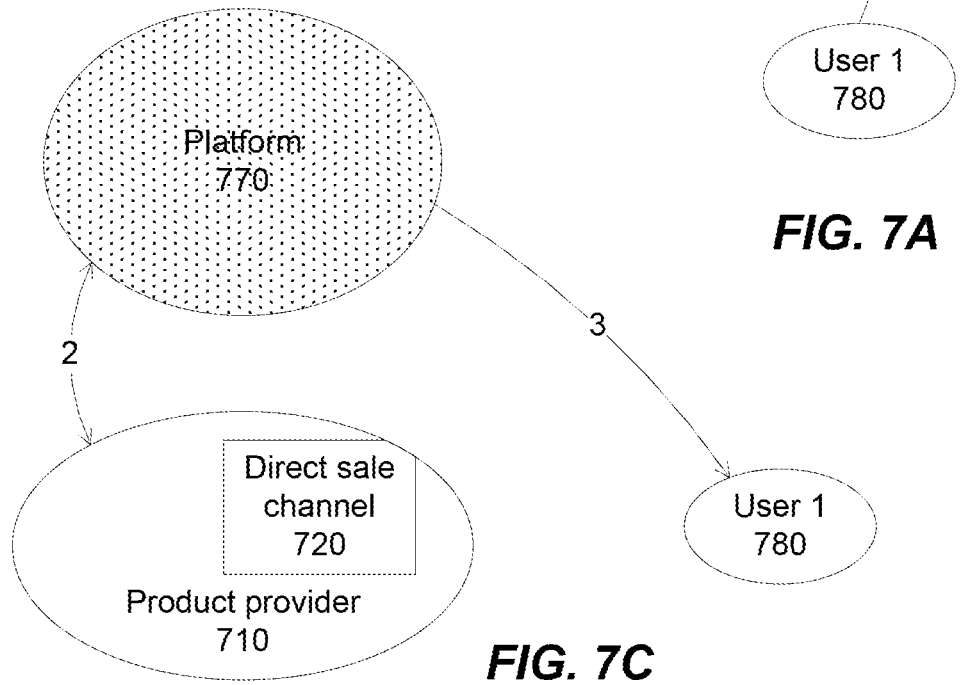
FIG. 7A
FIG. 7C

Contacting agents of a product provider, using an individual identity, to obtain a first price of a product
990

Negotiating with the product provider, using a company identity, to obtain a discount price from the product provider, wherein the discount price is less than a full price of the product, wherein the discount price is greater or equal to the first price
991

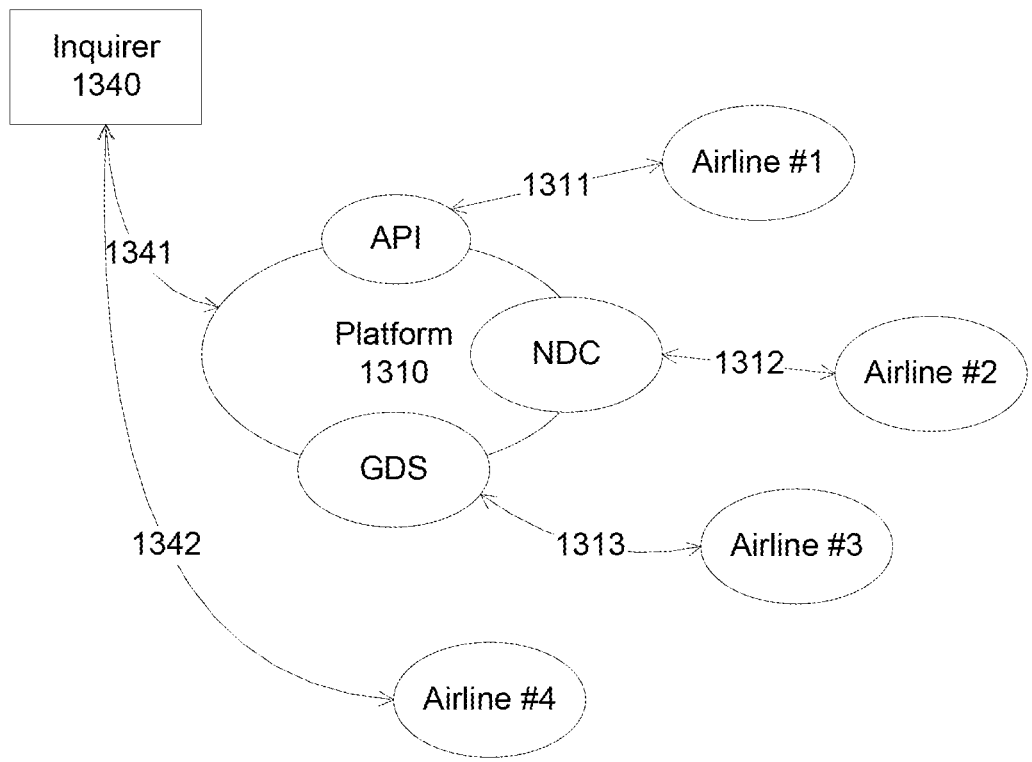

*FIG. 13A*

```
┌─────────────────────────────────────────────────────┐
│ Contacting first airlines, using an individual      │
│ identity, to obtain flight information from the     │
│ first airlines                                      │
│                     1390                            │
└─────────────────────────────────────────────────────┘
                          │
                          ▼
┌─────────────────────────────────────────────────────┐
│ Contacting second airlines, using a company         │
│ identity, to obtain flight information from the     │
│ second airlines                                     │
│                     1391                            │
└─────────────────────────────────────────────────────┘
                          │
                          ▼
┌─────────────────────────────────────────────────────┐
│ Processing flight information from the first and    │
│ second airlines                                     │
│                     1392                            │
└─────────────────────────────────────────────────────┘
```

*FIG. 13B*

OBTAINING SERVICES FROM PRODUCT PROVIDERS

CROSS REFERENCE TO RELATED APPLICATIONS

This application is a continuation of U.S. patent application Ser. No. 15/276,447, filed Sep. 26, 2016, which claims the benefit of U.S. Provisional Application No. 62/233,209, filed Sep. 25, 2015, which is incorporated by reference in its entirety.

BACKGROUND

Product providers, such as airlines, hotel facilities, car rental agencies, cruise operators, tour operators, and travel packagers, can employ agents for reselling their products. For example, a person can book for a hotel room or can rent a car through a travel agency. The agents, while serving to boost the sale of the products, can present some disadvantages for the product providers, such as reducing name recognition, lacking customer database, and loss of revenue for the providers.

For example, the agents can offer discounts, e.g., selling the products at a reduced price as compared to the full price offered by the product providers. This can reduce the name recognition for the product providers, since when needing the products; the customers can first approach the agents, instead of the product providers, to purchase the products. For example, a travel agency can offer a room at a Marriott hotel at an 85% of the full price that a customer can purchase through the Marriott website. This can lead to customers avoiding the hotel websites since they are perceived as having higher prices for the same product.

Further, booking through the agencies can deprive the product providers the detail information of the customers, e.g., reducing the customer database of the product providers. The agencies can obtain a lot of information about the customers, such as the customer preferences toward travels and staying, but only sharing a minimum amount of information with the product providers.

Further, booking through the agencies can mean a loss of revenue for the product providers, since the agency prices, though significantly less than the full price can still be higher than the price that the agencies pay the product providers.

Thus there is a need for improving the operations of the product providers.

SUMMARY

In some embodiments, the present invention discloses methods and systems for assisting customers to obtain best available prices of products to the customers. The methods can also improve operations of the product provider, such as increasing name recognition, increasing customer base, and increasing revenue.

In some embodiments, the methods can include telling the product providers about the offers available on the market, for example, by surveying the available prices offered by sale agents, and asking the product providers to match the best prices. The methods can include making an agreement with the product providers about matching the offers from sale agents. With the agreement, a platform can provide customers with product prices that can be lowest on the market. After the customers accept the offers from the platform, the platform can direct the customers to the product providers for purchase. The direct contact of the customers with the product providers can be beneficial to the product providers.

In some embodiments, the methods can include receiving inquiry from customers about the products, then surveying the available prices offered by the sale agents, and then contacting the product providers for matching prices.

In some embodiments, the present invention discloses using multiple identities in assisting a customer in obtaining flight itineraries from multiple airlines. A personal or individual identity can be used to contact individual airlines through their websites to obtain flight itineraries, and other flight information related to the flight itineraries. A corporate or company identity can be used to contact airline network, or individual airlines configured to handle business contacts, for example, through airline API or by using NDC standards.

BRIEF DESCRIPTION OF THE DRAWINGS

FIGS. 3A-3B illustrate flow charts for assisting a customer to obtain a good price for a product from a product provider according to some embodiments.

FIGS. 7A-7C illustrate a process for a platform to assist customers in purchasing products according to some embodiments.

FIGS. 13A-13B illustrate a configuration of a travel distribution system according to some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In some embodiments, the present invention discloses methods and systems for negotiating with product providers to obtain good prices for products of the product provider. The methods can include telling the product providers about the best offers available on the market, and asking the product providers to at least match the best offers. The methods can allow a customer to obtain best available prices for a product.

In some embodiments, the present invention discloses methods and systems for a customer to obtain a product at a good price. The customer can survey prices of the same or similar products offered by agents, e.g., sale agents, resale agents, and distributor agent, of a product provider. Using the available prices of the products, the customer then can negotiate with the product provider for a matching price.

Since the product prices offered by the agents are typically higher than the discount prices that the product provider agreed with the agents, a matched price can still be more profitable for the product provider. Further, a customer can recognize the product provider as the source of best price, thus can increase the name recognition of the product from the product provider. Further, since the customer deals directly with the product provider, the product provider can obtain a large customer base, with detail information about the customer.

The products can include a service, such as a tour or a travel package. The products can include a usage of an instrument or a facility, such as a hotel facility, a car rental agency, a cruise operation, or an airplane operation. The product providers can be an entity who performs the service, such as a company running the tour or travel package. The product providers can be an entity who operates the instruments of facilities, such as the hotel, the car rental, the cruise management, or the flight operations.

The agents can be the sale agents, resale agents, or distributor agents, who are responsible for selling the products, without any manufacturing linkage to the products.

Figure 1:
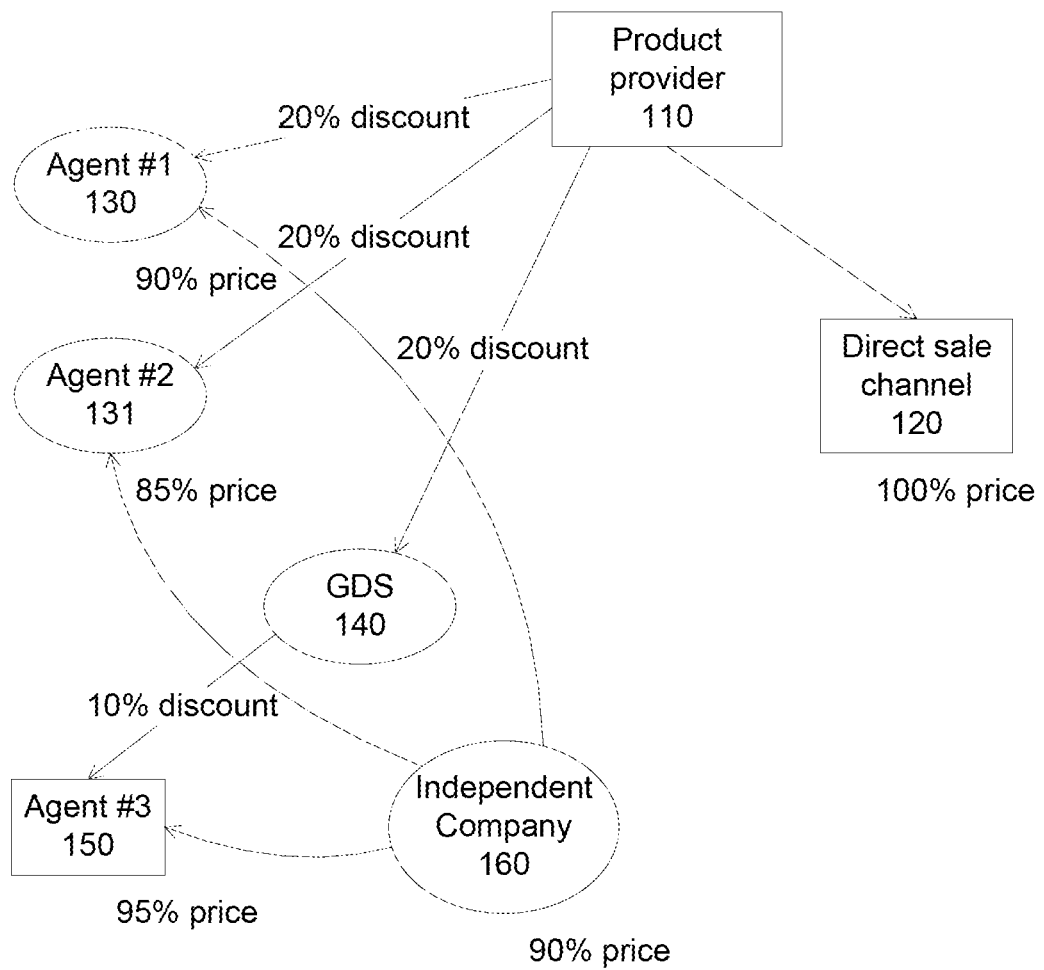
FIG. 1 illustrates an agent configuration for a product provider according to some embodiments.

FIG. 1 illustrates an agent configuration for a product provider according to some embodiments. A product provider 110 can maintain a direct sale channel 120, such as a website. The product provider 110 can employ sale agents who can sell the product, such as agents #1 (130) and agent #2 (131). The product provider 110 can also employ resale distributor, such as a Global Distribution System (GDS, like Sabre, Amadeus, Travelport, etc.) 140, who can employ resale agents, such as agent #3 (150) who can resell the product. In addition, there can be independent companies 160, who resell the products from the agents, e.g., either from agent 130, from agent 131, or from agent 150.

The product provider 110 typically sells the product at a full price, e.g., 100% price. Thus, when a customer contacts the direct sale channel 120, such as contacting the product provider through the website, the listed price is normally the full price of the product. For example, the product provider can be a hotel management, e.g., a corporation operating a chain of hotels or a company operating a hotel. The hotel can have a website, which can allow a potential customer to search for available rooms and prices, and for making room reservations.

In addition to direct sale, the product provider can employ sale agents and sale distributors, who in turn, employ resale agents. For example, a hotel management can use travel agencies as sale agents, e.g., a travel agency can sell rooms, e.g., getting a travel customer to book a room at the hotel. The hotel management can use GDS (Global Distribution System) as a sale distributor. A travel agency can have an agreement with GDS to resell rooms for the hotel, thus acting as a resale agent for the hotel. Further, there can be independent companies 160 that contract with the sale or resale agents to resell the product.

The product provider can offer discount to the sale agents and sale distributors, so that they can make a profit while selling the product at a same price as the product provider. For example, the product provider can provide a discount, such as 20% discount, to sale agents 130, 131, and to sale distributor 140. Thus when the sale agents sell the product, at 100% price, they can be profitable, e.g., at 20%.

The sale distributor 140 can employ resale agents, such as resale agent 150, for reselling the product. The sale distributor can offer discount to the resale agent, for example, at 10% discount of the full price.

Typically, the product provider and the agents, sale agents and resale agents, can sell the product at full price, e.g., at 100% price. Thus a customer can shop at either the product provider or at the agents and still get the same price.

To attract customers, some agents can sell the product at a reduced price, e.g., at less than 100% price, and still can make a profit, provided that the reduced price is greater than the agency discount, e.g., greater than 80% of the full price for 20% agency discount. For example, some sale agents can offer the product at 90% or 85% price, and some resale agents can offer the product at 95%. The lower price can direct customers away from the direct sale channel of the product provider.

The product provider can offer discounts to customers to generate more sales. For example, the product provider can offer 10% discount for a certain time period. However, this discount strategy is not designed to address the discount strategy of the sale or resale agents. For example, the discount price of the product provider can be offered when the price from agents is high (e.g., when the agents do not offer discount), or the discount price of the product provider is still higher than the discount price of the agents.

The product provider can monitor the offered prices from the agents, in order to provide a match price, e.g., offering a price similar to the lowest price from the agents. However, this strategy can be ineffective, for example, since it can alienate the sale agents because the product provider always offers a lower price than their price. Further, offering a match price without a target customer can significantly affect the revenue of the product provider.

In some embodiments, the present invention discloses methods to improve sales for a product provider. The methods can include offering match prices for inquiring customers. For example, for a knowledgeable customer inquiry, e.g., a customer who would know the offering prices of agents selling the same product, the product provider can accept match prices to the customer.

In some embodiments, the present invention discloses methods to assist a customer in obtaining a best price for a product. The methods can include inquiring about the available prices of a product from various sale and resale agents. After knowing the prices offered by the agents, an offer can be made to the product provider to achieve a match price.

Figure 2:
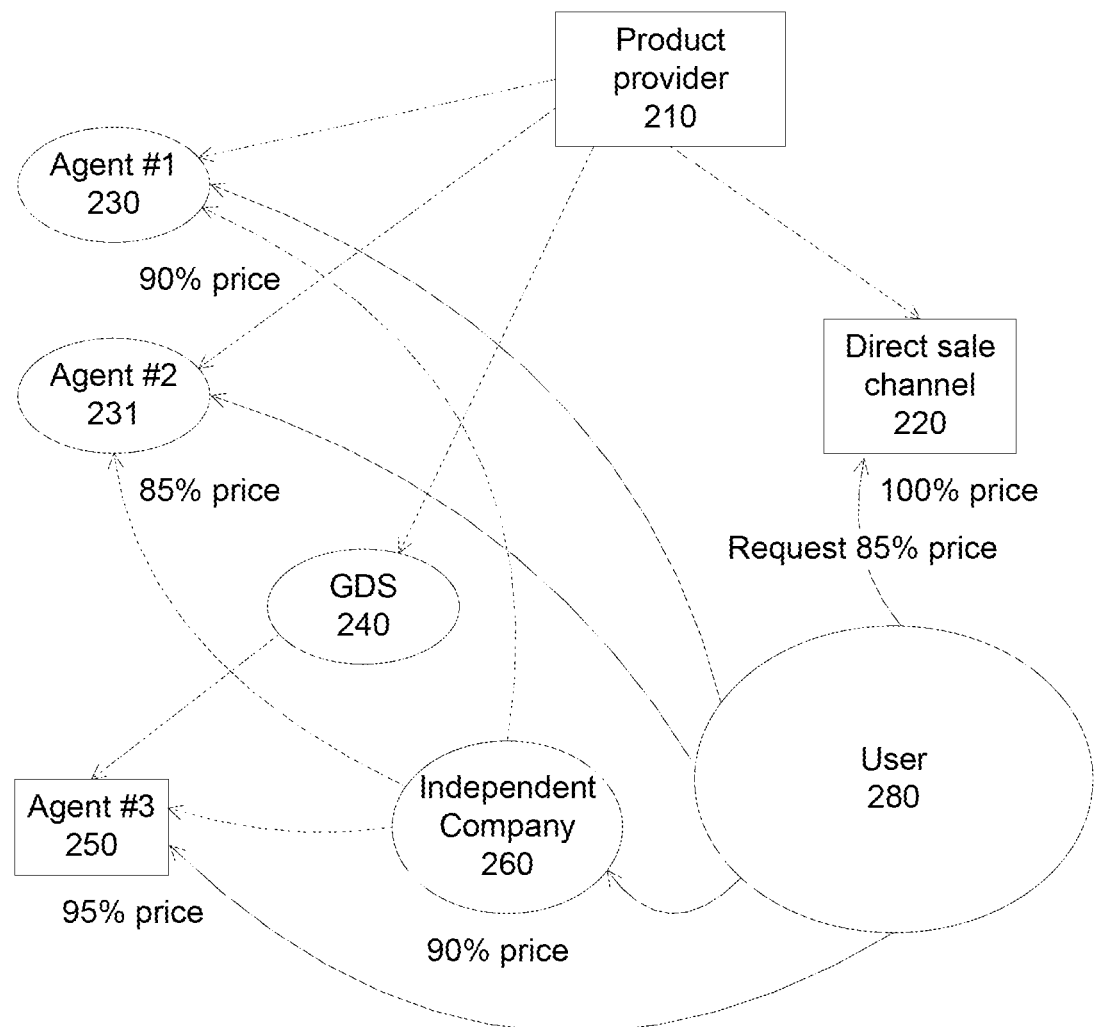
FIG. 2 illustrates a configuration for a customer in obtaining prices from a product provider according to some embodiments.

FIG. 2 illustrates a configuration for a customer in obtaining prices from a product provider according to some embodiments. A product provider 210 can have a direct sale channel 220, together with sale agents 230, 231, and sale distributor 240, which can have resale agent 250. In addition, independent company 260 can have agreements with the agents to resell the product. As shown, independent company 260 can re-sell the products from agent 231.

Different sale and resale agents can offer different prices for the product. For example, agent 230 can offer 90% price, agent 231 can offer 85% price, agent 250 can offer 95% price, and independent company can offer 90% price. These prices can be lower than the full 100% price offered from the direct sale channel 220 of the product provider.

A customer 280 can contact the agents to obtain the offered price of the product. The customer then can contact the product provider 210, for example, through the direct sale channel 220, such as the website of the product provider. The customer can request a matching price, e.g., asking the product provider to offer the product with a price equal to a lowest price from the agents. For example, the customer can request that the product provider offers the product at 85% price, similar to the offered price of agent 231.

It can be advantageous for both the product provider and the customer. The product provider can make a sale to the customer. The offered price is less than the full price, but the product provider can still make a profit. Further, the customer can still get the product at the asking price, at least from the agent 231. The customer can obtain the product at a lowest price, directly at the product provider.

In some embodiments, the present invention discloses an application that can assist a customer to obtain good price of products from the product provider. After receiving a product request from a customer, the application can survey the product prices from different agents, and then contact the product provider for matching the lowest price.

FIGS. 3A-3B illustrate flow charts for assisting a customer to obtain a good price for a product from a product provider according to some embodiments. The methods can include obtaining prices of a product from various sale agents, e.g., from agencies responsible for selling the product. After obtaining the agency prices, the methods can include negotiating with the product provider, e.g., with the entity responsible for managing the product, to obtain a good price. In FIG. 3A, operation 300 contacts agents of a product provider to obtain a first price of a product.

The product can include services, such as guiding customers for a tour, a travel package, or a cruise trip, or usages of a facility, such as using a hotel room, or usage of equipment, such as renting a car, or staying on a cruise ship.

The product provider can include entities performing the services, such as a tour management that operates the tour, e.g., supplying tour guides and arranging transportation equipment and resting facility, or a cruise management that operates the cruise ship, e.g., supplying the cruise ship and providing all services on the cruise ship. The product provider can include entities operating the facility, such as a hotel management that operates the hotel, e.g., maintaining the hotel ground, cleaning the room, and supplying other amenities such as dining or concierge services. The product provider can include entities operating the equipment, such as a car rental management that operates the car rental agency, e.g., maintaining the car rental parking lot and office, cleaning the cars, and supplying other amenities such as re-fuel or insurance services.

The agents can include entities selling the product, such as a travel agent that books a hotel room, rents a car, arranges a tour or cruise trip for customers. Thus an agent can be responsible only for selling the product, e.g., the services or usages of a facility or an equipment, while the product provider can be responsible for the product itself, such as operating, maintaining, or performing the services.

Operation 310 negotiates with the product provider to obtain a second price less than a full price from the product provider based on the first price.

In FIG. 3B, operation 330 provides a product provider, e.g., an entity such as a company that has some products available for the customer, wherein the product comprises a service or a usage of an instrument or a facility, wherein the product provider performs the service or operates the instrument or the facility, wherein the product provider directly sells the product, wherein the product provider also uses sale agents for selling the products. Operation 340 contacts the sale agents to obtain a first price of the product offered by the sale agents. If the first price offered by the sale agents is less than a second price offered by the product provider, operation 350 contacts the product provider to obtain a third price from the product provider that is less than the second price.

In some embodiments, the present invention discloses methods and systems for assisting a customer in obtaining a good price for a product. The methods can include surveying prices of the products offered by sale agents and resale agents of a product provider, and then negotiating with the product provider for a matching price. The methods can improve operations of the product provider, such as increasing name recognition, increasing customer base, and increasing revenue.

In some embodiments, the present invention discloses a platform, e.g., a program running on a data processing system, can be used to perform the method. When customers contact the platform about the products, the platform can offer the products directly from the product provider with a price matching the best available prices on the market. For example, the platform can direct the customers to the website of the product provider, and the customers can purchase the products directly from the product provider, at a price already agreed with the platform. Alternatively, the platform can represent the product provider to sell the products to the customers.

Figure 4A:
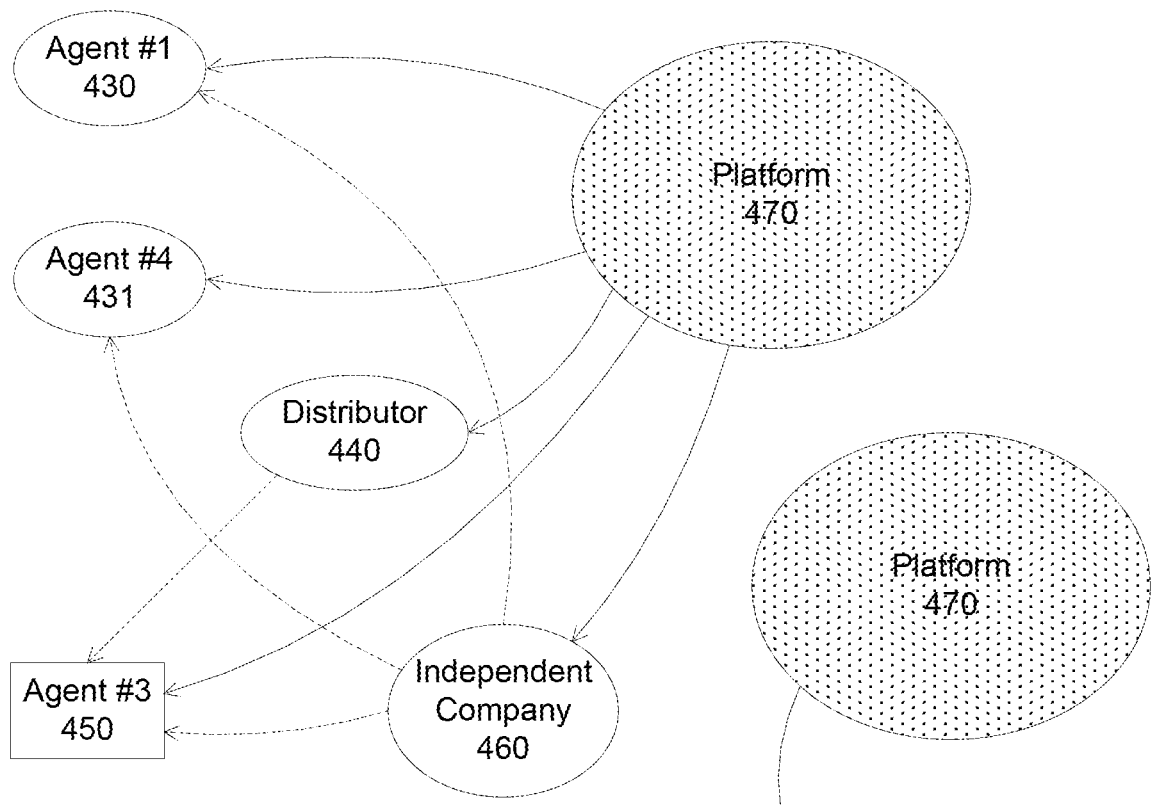
FIGS. 4A-4C illustrate a process for a platform to assist customers in purchasing products according to some embodiments.
Figure 4B:
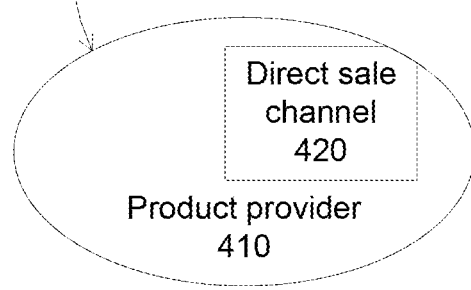
Figure 4C:
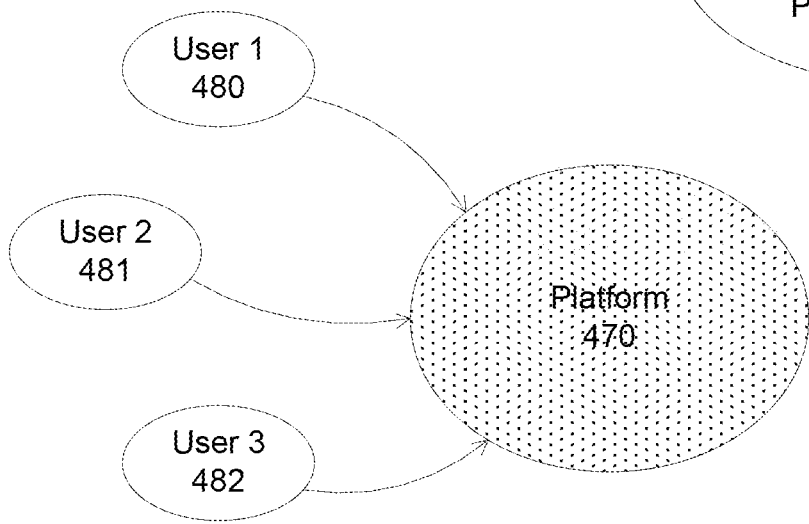

FIGS. 4A-4C illustrate a process for a platform to assist customers in purchasing products according to some embodiments. In FIG. 4A, a platform 470 can contact agents 430, 431, 450, distributor 440, and independent selling company 460 for getting prices of the products. The agents can include re-sale agents 450, e.g., agents for selling the products from a distributor 440. As shown, agent 450 can sell the products for the distributor 440. Alternatively, the distributor 440 can employ agents to sell, and can also sell the products. In that case, the distributor 440 can be considered as an agent, in the context of the present specification, which is an entity functioned to sell products, without product manufacturing (e.g., selling a product and not manufacturing the product), product servicing (e.g., an agent to represent a car rental company to selling car rental accommodation and not providing or servicing the cars, which actions are performed by the car rental company), or product operating (e.g., selling tickets for air flights or cruises and not operating the flights or the cruises, or selling hotel accommodation and not operating the hotels).

The agents can include sale agents 430 and 431, who are the agents of the product provider 410 to sell products. The sale agents can include distributor 440, who can also sell the products. For example, the product provider 410 can employ distributor 440 and sale agents 430 and 431 for selling the products at a commission.

The agents can include re-sale agents 460, which can be an independent company having a contract with a sale agent, such as sale agent 431, to sell the products.

In FIG. 4B, the platform 470 can contact a product provider 410, or can contact the direct sale channel 420 of the product provider for compatible prices for the products. Knowing the offered prices of the products on the market, e.g., sold by the agents, the platform can determine the best prices, e.g., cheapest prices for a base product, or best value prices for products with added amenities. The platform can discuss prices with the product provider, for example, to get the product provider to agree on compatible prices for the products.

The compatible price can be matched prices, e.g., the product provider can meet the cheapest price for a same or compatible product, or can meet the best value prices for products with amenities. The product provider can inform the platform that the product provider agrees that the prices for the products, either base products or products with options, can be the same or similar as the prices offered by agents. Thus when customers contact the platform, the platform can offer the matched prices for the products. The matched prices can be the same, or slightly higher or slightly lower than the prices offered by the agents. The slightly difference should be small enough so that the customers would not care, such as less than 1% of the total price.

The compatible price can be a higher price but for better values. For example, the product can be the same, but the base price for the product offered by the product provider can be higher than the price offered by the agents. The product provider can offset the high price with added amenities, e.g., free add-on bonus for the product.

In some embodiments, the product provider can offer more than just the product price, such as bonus offers or discount offers for amenities or options for the products. The platform can receive packaged offers from the product provider, and can select which offers to be offered to the customers, for example, based on a profile of the customers. For example, if a customer preference indicates a desire for early check in or airport lounge, the platform can present the offers together with the product, which can allow the product provider to increase sale.

For example, the product can be an air flight, e.g., offering tickets on an airplane for traveling between two locations. The product provider can be an airline, which can provide and service the airplane and operate counters at the airport for check in, together with other services such as baggage handling, on-flight entertainment and dining, and airport lounge. For the air flight product, the sale and re-sale agents can be GDS or travel agencies, who can make the air travel reservation for customers.

The product provider, e.g., the airline company, can offer compatible airfares as the agents, such as matching the prices or slightly lower or higher. The airline can also offer better value for the air flight, as compared to the cheapest airfares from agents. For example, the airfare offered by the airline can be higher than the cheapest airfare, but the airline can also offer free bonus, such as free early check in, free airport lounge, or free wifi on board. Thus, even though the airfare can be higher, the additional values based on the offers can provide a better value for the customers.

In some embodiments, the product providers can offer offerings, such as bonus offerings, discount offerings, or regular offerings, on the products. For example, an airline can offer free wifi, early check in, additional luggage, airport lounge access, and additional frequent flyer points. The total costs of the flights are the same, but the total values of the flights can increase significantly, due to the added free offerings from the airlines. Alternatively, the airline can offer these offerings, e.g., wifi, early check in, additional luggage, airport lounge access, and additional frequent flyer points, at a discount or at a regular price.

In some embodiments, the product providers can offer bonus offerings or discount offerings for promotion purposes. For example, in low sale season, the bonus offerings or discount offerings can entice the customers to select the products. The bonus offerings or discount offerings can be used to introduce a new service, for example, providing wifi during a flight, a three for two program in which buying two tickets can get the customer a free third ticket, or extra leg room seats, e.g., seating in an economy plus class, in which the front and back seats are spaced further apart than seating in an economy class. The bonus offerings or discount offerings can serve to validate new services, for example, to see how the customers respond to the ideas. The values of the bonus offerings or discount offerings can change, for example, depending on the sale seasons. For example, in high sale seasons, there can be minimum offerings, and in low sale seasons, there can be more offerings.

The bonus offerings or discount offerings can increase a customer loyalty, similar to a frequent flyer program. For example, a customer can sign up with a hotel or an airline for offering programs, and the hotel or the airline can offer bonus offerings or discount offerings when the customer selects a room with the hotel or a flight with the airline.

The offerings can include bonus offerings, which can be characterized as zero offered price, and a saving amount equaled to the regular price. For airline provider, the bonus offerings include free wifi, and free lounge access.

The offerings can include discount offerings, which can be characterized as having an offered price less than a regular price. For airline provider, the discount offerings include discounted early boarding, and discounted additional luggage.

The offerings can include regular offerings, which can be characterized as having an offered price similar to a regular price. For airline provider, the regular offerings include bonus frequent flyer points, seat upgrade (e.g., from economy seat to economy plus seat with larger seat and extra leg room), and business class upgrade. This is an example of the offerings. Other services can be offered as offerings, e.g., the platform can be used to present merchandises, as a bonus, as a discount, or as a regular service or product to the customer.

There can be a selection of the offerings. For example, when the customer places a mark on the select box, the customer agrees to buy the offered service at the offered price. For example, marks can be made for the bonus offerings of free wifi and free lounge access, which do not change the total cost of the products. The customer can de-select the bonus offerings. As default, there is no mark on the discount and regular offerings. If the customer is interested in any of the offerings, the customer can mark the selection, and the total cost and the total saving can be calculated accordingly.

The offerings can be based on a customer profile, e.g., the offerings can be tailored to the customer preferences. For example, a light traveling customer would prefer other offerings over an early check-in offering, since there can be minimum advantages for the light traveling customer to check in early.

In some embodiments, the offerings can be negotiated. For example, the product providers can provide offerings to the customers, and the customers can discuss about changing the offerings to better suit their preferences. The customers can propose new offerings to the product providers. The offerings can be custom offerings, e.g., the product providers can offer a bonus value, together with a list of offerings and prices. The customers can select offerings up to the bonus value.

In some embodiments, the present invention discloses a platform for the product providers to offer merchandises to customers. The platform can accept requests from customers for a product, and then provide the customers with bonus offerings from the product providers, together with information about the product. The offerings can be dynamic offerings, in which the offerings can be changed based on the sale seasons, based on the customer profile, or can be custom, e.g., selectable by the customer. The platform can also suggest or make recommendation for one or more products, based on a profile of the customers.

In some embodiments, the platform can make an agreement with the product provider to sell the products at compatible prices. For example, the product provider can agree to match the cheapest prices offered by the agents. The product provider can insist on higher prices, but can offer free bonus for a better value purchase.

In some embodiments, the agreement between the product provider and the platform can be for a time period, such as one day, few days, one week, two weeks, or one month. Thus after the platform surveys the agent prices, and reports the prices to the product provider, the product provider can agree with the platform for compatible prices for the products, valid for an agreeable period. The platform can continue surveying the agent prices. If the prices do not change, the platform can contact the product provider to extend the agreeable period. If the prices change, the platform can contact the product provider for a new price agreement.

In some embodiments, the new price agreement can occur after the expiration of the previous agreement. The new price agreement can also occur, e.g., the platform can contact the product provider for new prices, at any time, for example, when the agent prices change. For example, one day after the price agreement with the product provider, the platform can know that the agent prices change, either higher or lower, and the platform can contact the product provider to make new price agreement for new compatible prices, either higher or lower than in the previous price agreement, depending on the new agent prices.

The product provider 410 can be the one who employs the sale agents 430, 431, 450, 440, and 460. The product provider 410 can be the provider of the product, and can also perform a direct sale of the product.

The product can be a car rental, e.g., offering cars for people to rent. The product provider can be a car rental company, which can provide and service the cars and operate spaces for people who come to get and return the cars. For the car rental product, the sale and re-sale agents can be sale entities, such as travel agencies, who can make the reservation for customers, such as for a car at a location for a duration.

The product can be a hotel accommodation, e.g., offering rooms in a hotel, which includes any place offering short term or long term staying. The product provider can be a hotel management company, which can provide, operate and service the rooms in the hotel. For the hotel product, the sale and re-sale agents can be sale entities, such as travel agencies, who can make the reservation for customers, such as for a room at a hotel for a duration.

The product can be a cruise, e.g., offering rooms in a ship that travels from places to places. The product provider can be a cruise management company, which can provide, operate and service the rooms in the ship and the ship. For the cruise product, the sale and re-sale agents can be sale entities, such as travel agencies, who can make the reservation for customers, such as for a room in a cruise from a location to a location.

In FIG. 4C, customers 480, 481, and 482 can contact the platform 470 for inquiry about products, such as asking for a flight itinerary, a cruise, a car rental, or a hotel stay. The platform can offer best prices or best values for the products, from the product provider.

Figure 5A:
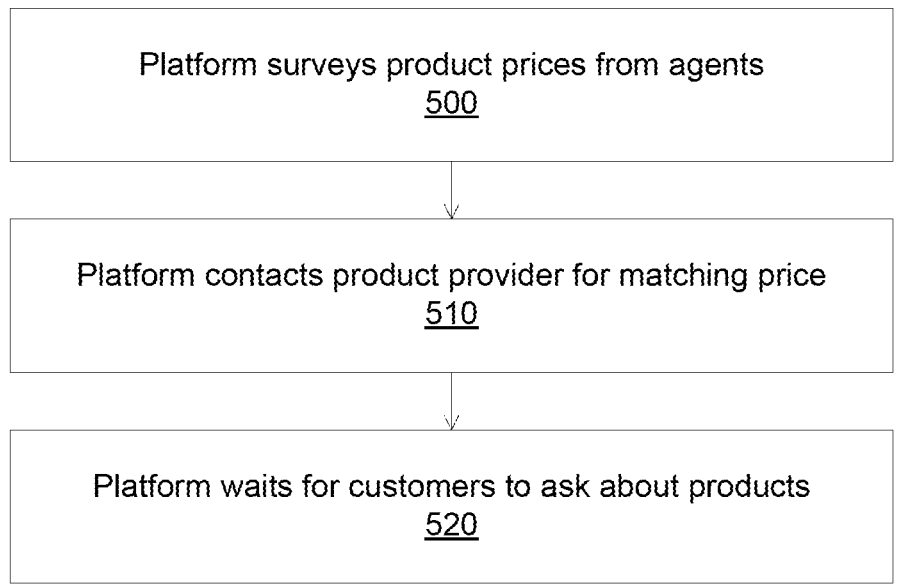
FIGS. 5A-5B illustrate flow charts for a platform to offer best prices or best values to a customer according to some embodiments.
Figure 5B:
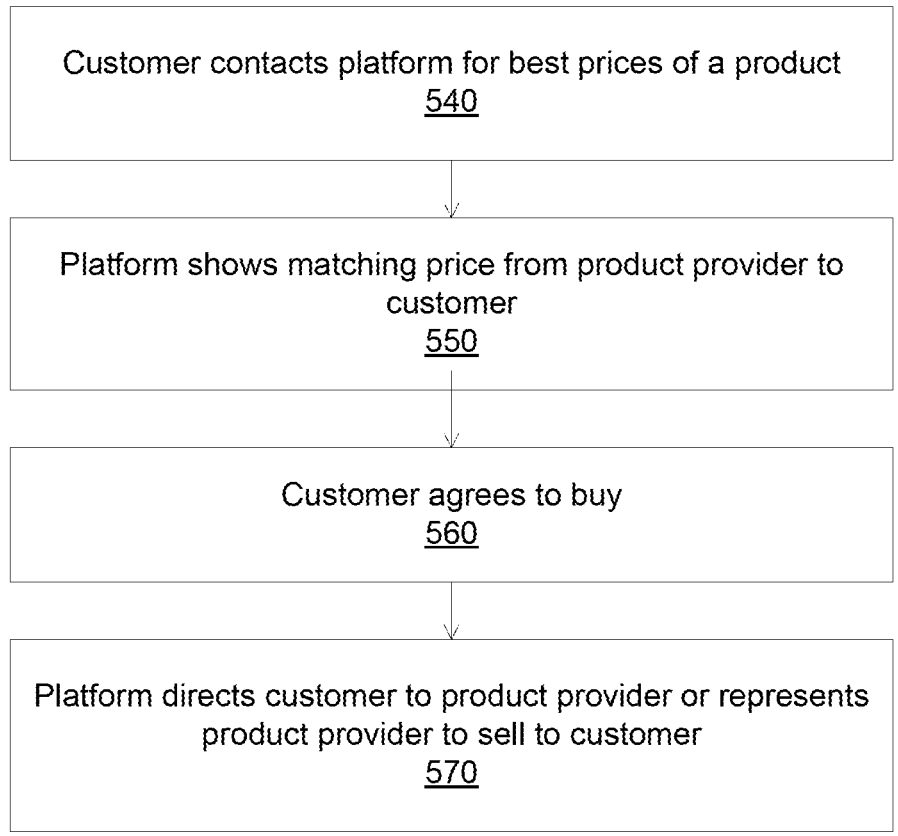

FIGS. 5A-5B illustrate flow charts for a platform to offer best prices or best values to a customer according to some embodiments. In FIG. 5A, operation 500 provides that a platform surveys product prices from agents. Operation 510 provides that the platform contacts product provider for matching price. Operation 520 provides that the platform waits for customers to ask about products.

In some embodiments, the present invention discloses a method, which can be a machine implemented method, e.g., operated and run by a data processing system. The method can include determining, by a platform, a lowest price among the offered prices of a product selling by agents. The platform can then negotiate with a provider of the product to obtain a matched price. The matched price can be compatible with the lowest price. The matched price can be offered to customers when the customers contact the platform about the product.

The products can include services or operations operated or serviced by the product provider. The products can include services or operations sold by the agents and by the product provider. The products can include renting a car, getting a hotel room, buying a cruise, or buying an air flight. The product providers can include a company renting cars, a company managed a hotel, a company operating a cruise, or an airline operating air flights. The agents can include selling agent, re-sale agents, or distributor agents.

The matched price can be lower or the same as the lowest price. The matched price can be similar to the lowest price. The matched priced offered by the product provider can be for the same product offered by the agents. The matched priced offered by the product provider can be for a compatible product. The matched priced offered by the product provider includes free amenities from the product provider.

In some embodiments, the method can further include that the platform contacts the agents to collect the prices offered by the agents for the products. The collected prices can be used to determine the lowest price, for example, by sorting the collected prices.

The platform can obtain the product prices from the agents by the published prices, e.g., by the prices that the agents publish or advertise. For example, the prices can be posted on the websites of the agents. Alternatively, the platform can sign up with the agents to obtain prices that are not in the public domain. For example, some agents can prefer that a customer calls or contact them for prices and availability. The platform can establish an account with the agents, using an identification of the platform, e.g., a corporate or a company identification.

In some embodiments, the lowest price can be the highest value for the products, e.g., the lowest price can be a result of an evaluation of the value of the product and the lowest price can represent a best value, and not necessarily the lowest monetary cost. For example, a high airfare for a reputable and safe airline can have better value than a slightly lower airfare from an airline having a much worse safety record.

The method can further include offering the matched price to a customer when the customer contacts the platform about the product. The platform then can direct the customer to the product provider when the customer accepts the offering of the matched price, such as transferring the customer to the website of the product provider. Alternatively, the platform can represent the product provider to sell the product to the customer when the customer accepts the offering of the matched price.

In some embodiments, the method can further include contacting the agents using an identification of the customer. When a customer contacts the platform about the product, the customer can provide his identification, for example, by signing in with the platform. The customer can open an account, e.g., providing his personal information to the platform. Thus by signing in, the platform can have the identification of the customer. The platform then can contact the agents using the identification of the customer, to obtain product prices.

The customer identification can result in a lower price as compared to prices available to the public. For example, the customer can have a preferred status with the agents, so that the agents can offer better prices to the customer.

If the prices obtained by the customer identification are higher or the same as the matched price from the product provider, the platform can offer the matched price to the customer, knowing that the matched price can be the best available price for the product.

If the prices obtained by the customer identification are lower than the matched price, example, due to a special status of the customer, the platform can contact the product provider with the new prices, e.g., the prices obtained by using the customer identification, and ask for a new matched price. Once the new matched price is obtained, the platform can offer the new matched price to the customer. Alternatively, if a new matched price is not obtained, for example, by the product provider inability to match the new prices, the platform can show the prices from agents, the old matched price (e.g., which matches the old agent prices, but is higher than the agent prices using the customer identification), and/or all prices from agents and from the product provider. The customer can make a decision to buy from the agents or from the product provider. For example, if the customer decides on the lower prices from the agents, the platform can direct the customer to the agent websites, and sign in with the customer identification to show the low prices.

In some embodiments, the platform can skip the step of contacting the product provider for a new matched price, for example, since the product provider can indicate that there can be no further reduction in prices. The platform can show the prices from agents, the old matched price, and/or all prices from agents and from the product provider. The customer can make a decision to buy from the agents or from the product provider. For example, if the customer decides to buy from the product provider, the platform can direct the customer to the website of the product provider.

In FIG. 5B, operation 540 provides that a customer contacts platform for best prices of a product. The platform can advertise as a place that offers best value and best prices for products. Thus customers, when looking for a product, can contact the platform.

In some embodiments, the customers can establish accounts with the platform, for example, to offer personal data and preferences, so that the platform can tailor the products and product options to suit the customers.

Operation 550 provides that a platform shows matching price from product provider to customer. The matching price can be compatible with the lowest or best prices from the agents. The matching price can be obtained by the platform surveying the agent prices, and then contacting the product provider for an agreement of matching prices.

Operation 560 provides that a customer agrees to buy. Operation 570 provides that a platform directs customer to product provider or represents product provider to sell to customer.

Figure 6:
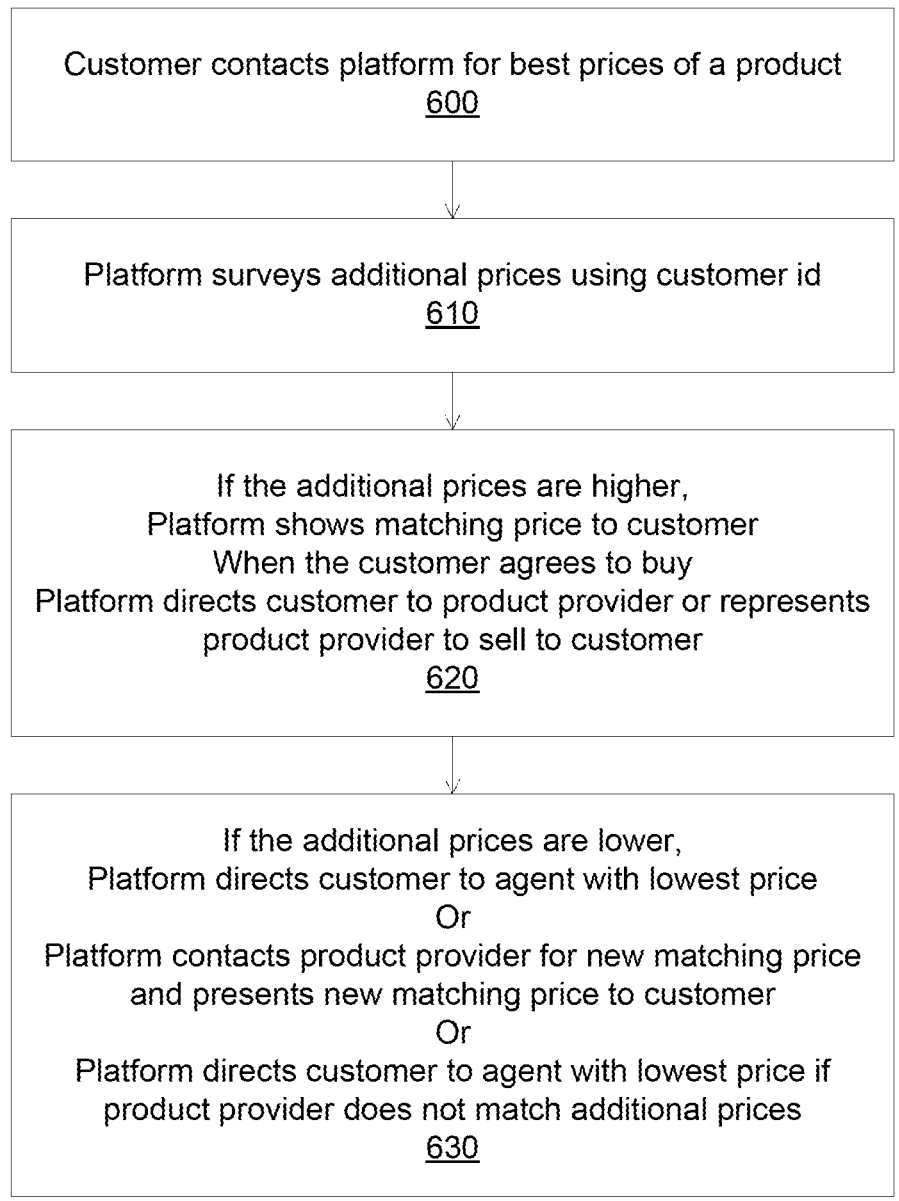
FIG. 6 illustrates a flow chart for a platform to offer best prices or best values to a customer according to some embodiments.

FIG. 6 illustrates a flow chart for a platform to offer best prices or best values to a customer according to some embodiments. The method can include using a corporate identity to make an agreement with product providers for price matching. The corporate identity can also be used for getting agent prices, e.g., for prices that are available to the public. The method can further include using a personal identity, e.g., the identity of the customer, to contact agents for prices that can be better than the prices for the public.

In some embodiments, the present invention discloses using a dual identities for getting best prices for customers. A personal identity can be used for contact agents, and a corporate identity can be used to contact the product providers.

Operation 600 provides that a customer contacts platform for best prices of a product. Operation 610 provides that a platform surveys additional prices using customer identification. The platform can already survey previous prices from agents using the platform identification, or by using an anonymous identification. The platform can have an agreement with the product providers for matching prices with the best available prices if not using a personal identification.

Operation 620 provides that, if the additional prices are higher or equal to the previous prices, then the platform shows the matching price to the customer. And when the customer agrees to buy, the platform can direct the customer to the product provider or can represent the product provider to sell to the customer.

Operation 630 provides that, if the additional prices are lower than the previous prices, then the platform can show the customer the agent with the lowest price. Optionally, the platform can show offers from the product provider, e.g., together with the lowest prices from agents. The offers from the product provider can show better values, such as bonus or discount offerings, so that the customer can be enticed to go with the product provider. If the customer decides on the lowest prices, then the platform can direct the customer to the agent with the lowest prices.

Alternatively, the platform contacts product provider for new matching price for the additional lower price. If the product provider agrees to a new matching price, the platform can present the new matching price to customer. If the product provider does not agree to a new matching price, the platform can show the customer the agent with the lowest price. Offers from the product provider can be included. Depending on the customer selection, the platform can direct the customer to the agent with the lowest price or direct the customer to the product provider.

In some embodiments, the present invention discloses a method for providing a customer with best prices. The method can include receiving an inquiry from a customer about a product; offering a first price for the product to the customer, wherein the product is provided from a product provider, wherein the first price is compatible with a lowest price for the product among second prices selling by agents; directing the customer to the product provider when the customer accepts the price.

In some embodiments, the method can further include contacting the agents to collect the second prices for determining the lowest price. The method can also include determining the lowest price among second prices of the product selling by agents; and negotiating with a provider of the product to obtain the first price.

In some embodiments, the product comprises services or operations operated or serviced by the product provider. The product comprises services or operations sold by the agents and by the product provider. The product comprises renting a car, getting a hotel room, buying a cruise, or buying an air flight. The product provider comprises a company renting cars, a company managed a hotel, a company operating a cruise, or an airline operating air flights. The agents comprise selling agent, re-sale agents, or distributor agents. The first price is lower or the same as the lowest price. The first price is similar to the lowest price. The first priced is for the same product offered by the agents. The first priced is for a compatible product.

In some embodiments, the method can further include contacting the agents, by the platform using identification of the customer, to obtain third prices using the identification of the customer. If the third prices are higher or the same as the first price, offering the first price to the customer. The method can also include contacting the agents, by the platform using identification of the customer, to obtain third prices using the identification of the customer. If one of the third prices is lower than the first price, contacting the product provider for a new price. The platform can offer the new price to the customer. The method can also include contacting the agents, by the platform using identification of the customer, to obtain third prices using the identification of the customer. If one of the third prices is lower than the first price, the platform can direct the customer to the agent with the lowest third price. The method can also include contacting the agents, by the platform using identification of the customer, to obtain third prices using the identification of the customer. If one of the third prices is lower than the first price, contacting the product provider for a new price. The platform can direct the customer to the agent with the lowest third price.

In some embodiments, the present invention discloses methods and systems for assisting a customer in obtaining a good price for a product. The methods can include surveying prices of the products offered by sale agents and resale agents of a product provider, and when a customer asks for a product, contacting a product provider for a matching price to a lowest price offered by the agents.

In some embodiments, the present invention discloses a platform, e.g., a program running on a data processing system, can be used to perform the method. When customers contact the platform about the products, the platform can survey the prices from different agents, and then negotiate with the product providers for matching prices. The platform then can offer the products to the customers, directly from the product provider with a price matching the best available prices on the market. For example, the platform can direct the customers to the website of the product provider for direct purchases. The platform can also represent the product provider to sell the products to the customers.

FIGS. 7A-7C illustrate a process for a platform to assist customers in purchasing products according to some embodiments. In FIG. 7A, a customer 780 can contact a platform 770, for example, to inquire about a product. In FIG. 7B, the platform 770 can contact agents 730, 731, 750, distributor 740, and independent selling company 760 for getting prices of the product. The agents can include re-sale agents 750, distributor 740, sale agents 730 and 731, and re-sale agents 760. As shown, the customer contacts the platform before the platform asking the product provider. Alternatively, the platform can contact the product provider before the customer contacting the platform.

In FIG. 7C, the platform 770 can contact a product provider 710, or can contact the direct sale channel 720 of the product provider for compatible prices for the products. The platform can discuss prices with the product provider, for example, to get the product provider to agree on a compatible price for the product, e.g., a price matching the lowest offered price from the agents. The platform then can offer the compatible price from the product provider to the customer.

If the platform cannot match the agent prices, e.g., the price from an agent can be too low, then the platform can show the customer the low price from the agent. This can allow the customer to know the lowest price for the product. The platform can also show information from the product provider, for example, bonus offerings and such, to entice the customer to buy the product from the product provider.

Figure 8:
FIG. 8 illustrates a flow chart for a platform to offer best prices or best values to a customer according to some embodiments.

FIG. 8 illustrates a flow chart for a platform to offer best prices or best values to a customer according to some embodiments. Operation 800 provides that a platform surveys product prices from agents. Operation 810 provides that a customer contacts platform for best prices of a product. Operation 820 provides that the platform contacts product provider for matching price. Operation 830 provides that the platform shows the matching price from the product provider to the customer. Operation 840 provides that the customer agrees to buy. Operation 850 provides that the platform directs customer to product provider or represents product provider to sell to customer. Operation 860 provides that the platform directs the customer to the agent with the lowest price if the product provider does not match the prices.

In some embodiments, the present invention discloses a method that can include receiving an inquiry from a customer about a product; determining a lowest price among the offered prices of a product selling by agents; negotiating with a provider of the product to obtain a matched price, wherein the matched price is compatible with the lowest price; offering the matched price to the customer after obtaining the matched price.

In some embodiments, determining the lowest price can be performed before or after receiving the inquiry. The platform can survey the prices of the products from the agents, and use the surveyed prices to determine the lowest price, before any contact from customers. Alternatively, the customer can contact the platform about a product, and then the platform can survey offered prices from agents for the product that the customer inquired. The platform can determine the lowest price of products, in order to negotiate with the product providers. The platform can negotiate with the product providers using an identification of the platform, e.g., as a corporate entity or a company.

In some embodiments, the platform can contact the agents in the public domain, using an identification of the platform, e.g., as a corporate entity or a company, or using an identification of the customer. For example, the platform can search for the prices in the websites of the agents, e.g., the prices are published by the agents for potential customers. The platform can use the corporate identity, e.g., the identification of the platform, to contact the agents for prices, e.g., for products that the agents do not publish and/or for products that the agents require the potential customers to contact the agents before receiving the prices. The platform can use the customer identity, e.g., after the customer contacts the platform and provides his identification, to contact the agents for prices, e.g., for special prices for customers with special status such as preferred customers.

In some embodiments, the method can further include directing the customer to the product provider when the customer accepts the offering of the matched price. Alternatively, the platform can represent the product provider to sell the product to the customer when the customer accepts the offering of the matched price.

In some embodiments, the method can further include directing the customer to the one with lowest prices. For example, if the product provider cannot match the agent prices, then the platform can direct the customer to the agent with the lowest price. If the product provider matches the prices, then the platform can direct the customer to the product provider.

In some embodiments, the method can further include providing options, e.g., add-on, to the products. For example, the product provider can offer options, e.g., offerings such as bonus offerings, discount offerings, or regular offerings, in addition to the product price. The product provider can offer bonus offerings, which can raise the value of the product. For example, in the case that the product provider cannot match the agent prices, the product provider can provide bonus offerings so that the total value of the product offered by the product provider can be higher, even though the total cost is higher than those of the agents. The product provider can offer discount and/or regular offerings. The discount and/or regular offerings can be based on the customer preferences, so the customer can be likely to purchase these offerings.

In some embodiments, the present invention discloses using multiple identities in methods for assisting a customer in obtaining a good price for a product. For example, a personal or individual identity can be used to obtain the prices of the product from the agents. A corporate or company identity can be used to negotiating the price with the product provider.

The present invention recognizes that the agents can prefer dealing directly with the customers, so a personal or individual identity can be used for contacting the agents. Since the contacting is on behalf of the customer looking to buy the product, it can be proper to use the customer identity in contacting the agents.

The present invention recognizes that the product provider can prefer dealing with a corporation, so a company or a corporation identity, or a personal identity if preferred by the product provider, can be used for contacting the product provider. A corporate identity can be used to represent multiple customers that are interested in obtaining good prices from the product provider.

Figures 9A, 9B:
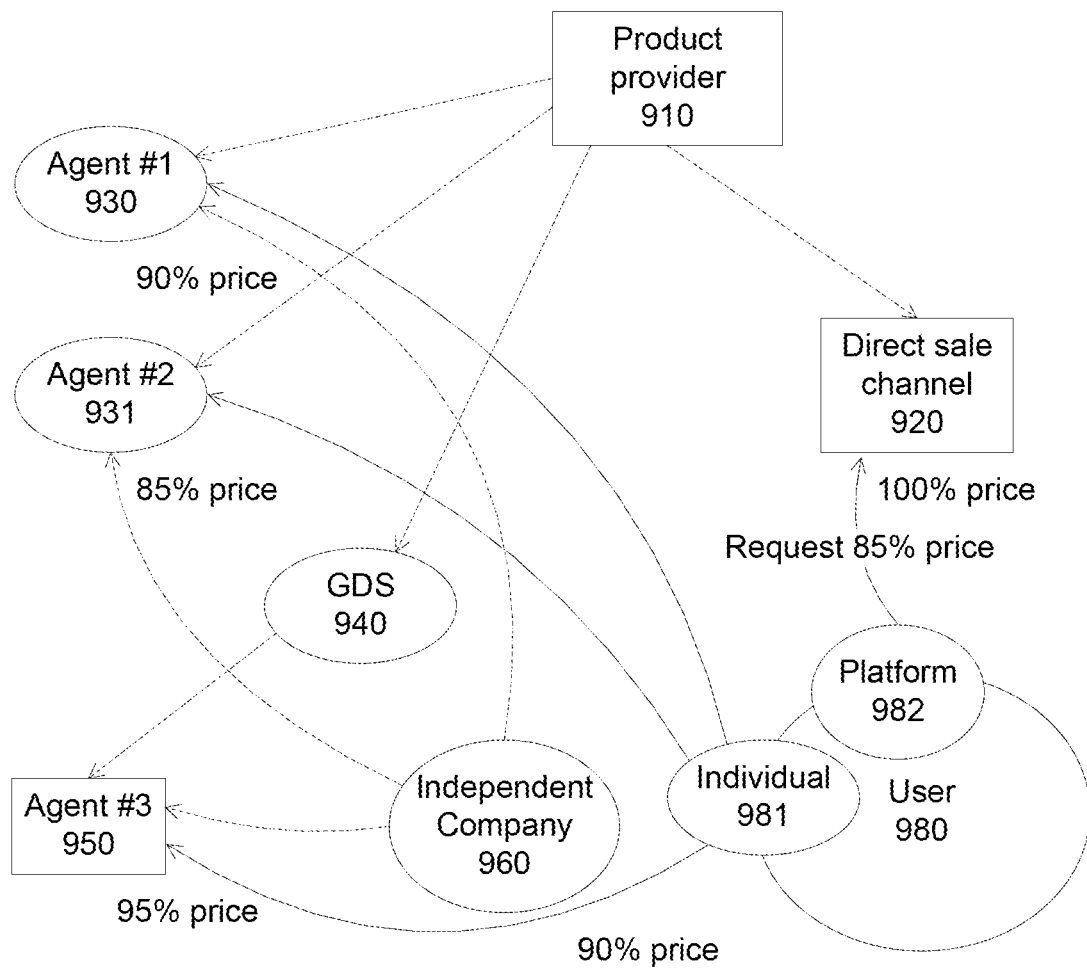
FIGS. 9A-9B illustrate a configuration for a customer in obtaining prices from a product provider according to some embodiments.

FIGS. 9A-9B illustrate a configuration for a customer in obtaining prices from a product provider according to some embodiments. In FIG. 9A, a product provider 910 can have a direct sale channel 920, together with sale agents 930, 931, and sale distributor 940, which can have resale agent 950. In addition, independent company 960 can have agreements with the agents to resale the product.

A user 980 can use an individual or personal identity 981 to contact the agents, and use a platform identity 982, e.g., a company or a corporation identity, representing multiple individuals, to contact the product provider, for example, through the direct sale channel 920 of the product provider.

FIG. 9B shows a flow chart for assisting a customer in obtaining a good price for a product from a product provider according to some embodiments. Operation 990 contacts agents of a product provider, using an individual identity, to obtain a first price of a product. Operation 991 negotiates with the product provider, using a company identity, to obtain a discount price from the product provider, wherein the discount price is less than a full price of the product, wherein the discount price is lesser, greater or equal to the first price.

In dome embodiments, the present invention discloses using different identities for contacting different entities. The method can include using dual identities to contact different airline entities for obtaining flight itineraries. The dual identities can include a personal identity and a corporate identity. The different airline entities can include individual airlines and a network of airlines. For example, individual airlines can be contacted using the personal identity. The airline network can be contacted using the corporate identity.

In some embodiments, the present invention discloses methods and systems for coupling multiple identities for contacting agents and product providers. The multiple identities can include a company identity, which can be the identity of a company running an operation for assisting the customers in obtaining good prices for the products. A platform, such as a server, can be used to represent the company, e.g., multiple individual customers can allow the platform to represent them in contacting the product provider.

The multiple identities can include individual identities, which can be the identities of the customers. A user account can be used to represent a customer. For example, a customer can log in the platform account using the user account, e.g., using the customer individual identity, and then using the user account to contact the agents. The customer can contact the agents, or the platform can contact the agents, using the customer information.

In some embodiments, a customer can contact the agents, and can use a company to contact the product provider.

Figure 10A:
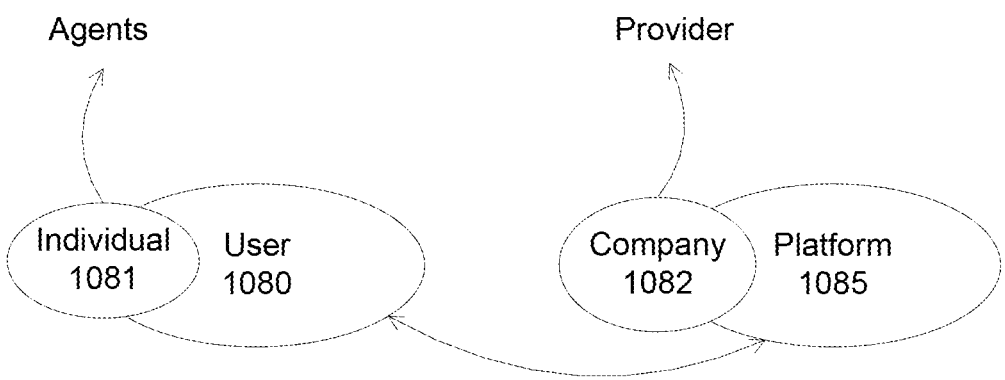
FIGS. 10A-10B illustrate a configuration for identity coupling according to some embodiments.
Figure 10B:
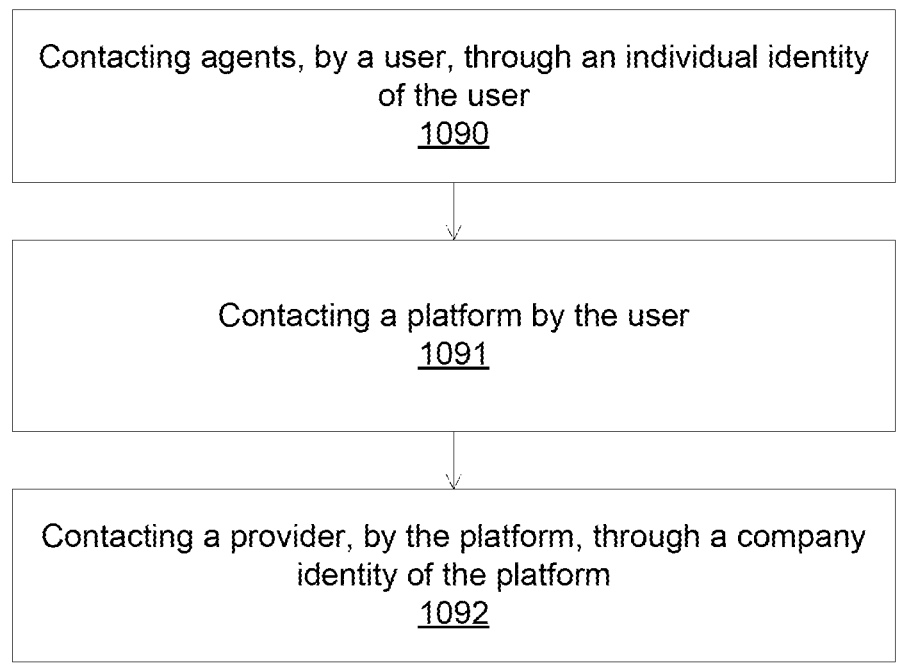

FIGS. 10A-10B illustrate a configuration for identity coupling according to some embodiments. A customer can directly contact agents for surveying prices of a product. The customer then contacts a company, providing the product price information to the company. The company then can contact the provider of the product, to negotiate a price of the product for the customer, such as a matching price for the lowest price from the agents. The company can report the result to the customer.

In FIG. 10A, a user 1080 can use an individual identity 1081, such as the name and address of the user, to contact the agents of a product. For example, the user can call one or more travel agencies or submit a form at the travel agency websites for reserving a hotel room at a hotel. The user 1080 then can contact a platform 1085, such as a server specializing in assisting customers for achieving good product prices. The user can supply the price information obtained from the agents to the platform. The platform can use a company identity, such as the corporation identity of the server, to contact the product provider for negotiating a good price for the customer. For example, the platform can disclose the profile of the customer to the supplier in negotiating a better price.

An advantage of using a company identity is that the company can negotiate a prior agreement with the product provider, thus after receiving the price information from the customer, the company can surely obtain the same price of the product from the product provider. The prior agreement can include an agreement that the product provider can match agent prices for customers that the company can introduce to the product provider. The product provider can also obtain customer information, for example, to add to the database of the product provider.

FIG. 10B shows a flow chart for identity coupling according to some embodiments. Operation 1090 contacts agents, by a user, through an individual identity of the user. Operation 1091 contacts a platform by the user. Operation 1092 contacts a provider, by the platform, through a company identity of the platform.

In some embodiments, a customer can use a company to contact both the agents and the product provider.

Figure 11A:
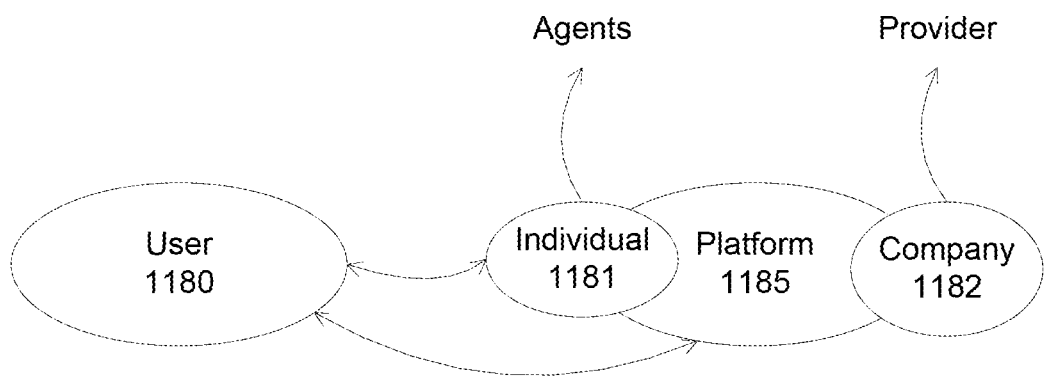
FIGS. 11A-11B illustrate a configuration for identity coupling according to some embodiments.
Figure 11B:
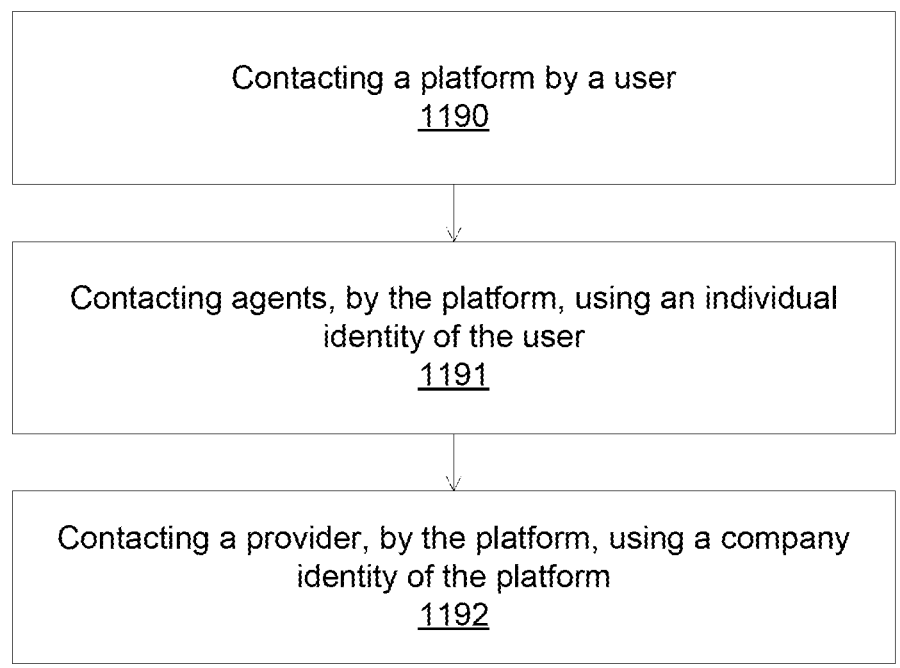

FIGS. 11A-11B illustrate a configuration for identity coupling according to some embodiments. A customer can contact a company, expressing the desire to purchase a product. The company then can contact agents, using the customer identity, for surveying prices of a product. The company then can contact the provider of the product, to negotiate a price of the product for the customer, such as a matching price for the lowest price from the agents. The company can report the result to the customer. The platform can include a application, e.g., a program, in a data processing system, such as a server or a mobile phone.

For example, a customer can log in to a platform with his identification, and then request a product. The platform can use the identification of the customer to obtain agent prices, and use the platform identification, e.g., a company responsible for maintaining the platform, to obtain good prices from the product provider.

In FIG. 11A, a user 1180 can contact a platform 1185, such as a server specializing in assisting customers for achieving good product prices. The user can provide his identification and a product purchase request to the platform. The platform can use the customer identity 1181, such as the name of the customer, to contact the agents of a product. For example, the platform can call one or more travel agencies or submit a form at the travel agency web sites for reserving a hotel room at a hotel. After receiving the agent prices, the platform can use a company identity, such as the corporation identity of the server, to contact the product provider for negotiating a good price for the customer.

FIG. 11B shows a flow chart for identity coupling according to some embodiments. Operation 1190 contacts a platform by the user. Operation 1191 contacts agents, by the platform, using an individual identity of the user. Operation 1192 contacts a provider, by the platform, using a company identity of the platform. The platform can also use the individual identity of the user, for example, by showing that the platform represents the user in dealing with the provider.

In some embodiments, a customer can contact both the agents and the product provider through the customer account. The customer can use his identification for the agent prices, and use the company identification for the product provider price.

Figure 12A:
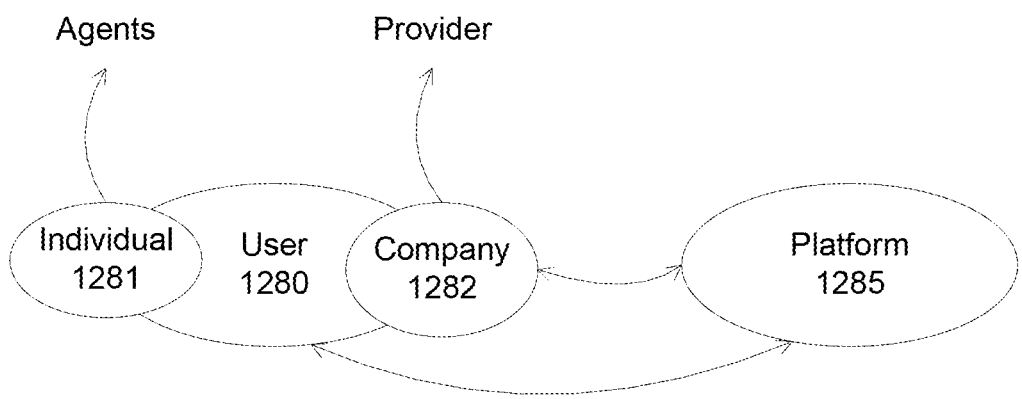
FIGS. 12A-12B illustrate a configuration for identity coupling according to some embodiments.
Figure 12B:
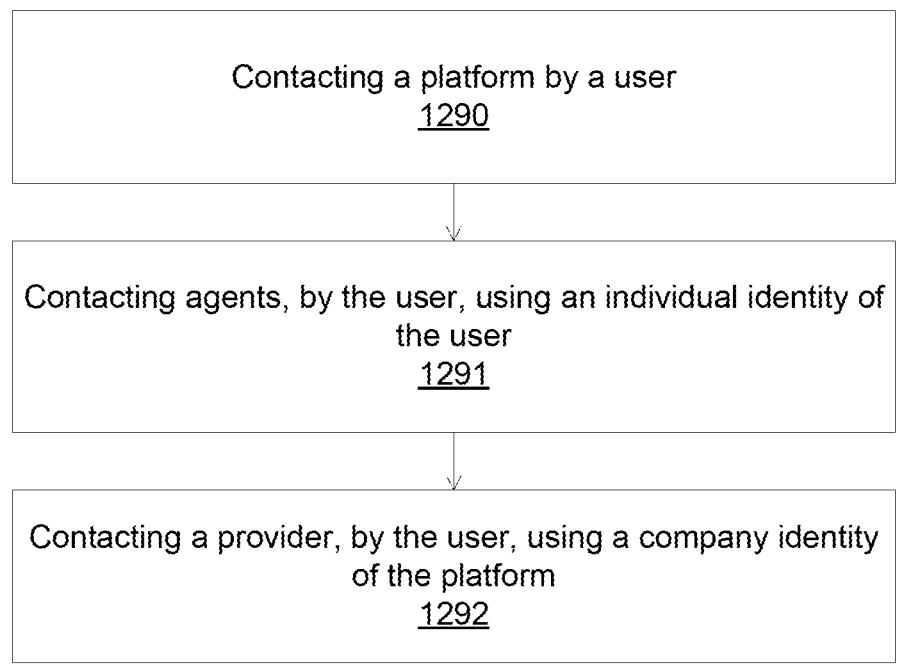

FIGS. 12A-12B illustrate a configuration for identity coupling according to some embodiments. A customer can contact a company for assisting in obtaining a good price for a product. The customer then can contact agents, using the customer identity, for surveying prices of a product. The customer then can contact the provider of the product, using the company identity, and optionally with the customer identity, to negotiate a price of the product for the customer, such as a matching price for the lowest price from the agents.

In some embodiments, the company can have prior agreement with the product provider. Thus the customer can use his own identity to contact agents for agent prices, and can submit the agent prices to the product provider, with reference to the company, to obtain the matching price from the product provider.

For example, a customer can use his personal identification to obtain agent prices. The customer then can log in to a platform to send the agent prices to the product provider to obtain a match price. Since the request include both the customer and the platform information, the product provider can use the platform information to check for the agreement with the platform, and use the customer information to provide the product to the customer.

In FIG. 12A, a user 1280 can use an individual identity 1281, such as the name and address of the user, to contact the agents of a product. The user 1280 then can use a company identity 1282 to contact the product provider for obtaining a good price for the product. The company identity can be from a platform 1285, that the user has contact with.

FIG. 12B shows a flow chart for identity coupling according to some embodiments. Operation 1290 contacts a platform by the user. Operation 1291 contacts agents, by the user, using an individual identity of the user. Operation 1292 contacts a provider, by the user, using a company identity of the platform.

In some embodiments, the present invention discloses using multiple identities in a travel distribution system that can assist a customer in searching for airline itineraries. For example, a personal or individual identity can be used to obtain airline itineraries from airlines using the internet as direct sale channel, such as using websites or API (application program interface) protocols. A corporate or company identity can be used to obtain airline itineraries from airlines using NDC protocols, or airlines participating in GDS system, or airlines using API protocols.

The present invention recognizes that some low cost airlines can prefer dealing directly with the customers through the internet, for example, using their websites. So a personal or individual identity can be used for contacting these airlines.

The present invention recognizes that some airlines can prefer dealing with a corporation, for example, airlines using NDC protocols, or airlines participating in GDS system. So a company or a corporation identity can be used for contacting these airlines.

In some embodiments, the present invention discloses a travel distribution system that allows coupling to multiple airlines, for example, to traditional airlines and to low cost airlines. The coupling of the travel distribution system to multiple airlines can allow the comparison between airlines, so that consumers can choose a travel package that most suits their needs.

In some embodiments, the present invention discloses a travel distribution system which can include a platform for communicating with airlines through NDC protocols, through a GDS system, and through API protocols. The travel distribution system can communicate with airlines through the internet.

FIGS. 13A-13B illustrate a configuration of a travel distribution system according to some embodiments. A travel distribution system 1300 can include a platform 1310, which can communicate 1312 with different airlines through the NDC protocols. The platform 1310 can be configured to communicate 1313 with a GDS system. The platform 1310 can be configured to communicate 1311 with airlines through the airline API. An inquirer 1340 can go 1341 through the platform 1310 to get information from airlines, e.g., airlines using NDC protocols, airlines participating in GDS system, and airlines having API protocols.

In addition, the travel distribution system 1300 can provide the inquirer with access to airlines through the airline websites, for example, through an internet connection 1342. Certain airlines offer services through their websites, without being accessible through NDC protocols, GDS system, and/or API information. The travel distribution service 1300 can also provide the inquirer with access to these airlines.

FIG. 13B shows a flow chart for searching for airline itineraries according to some embodiments. Operation 1390 contacts first airlines, using an individual identity, to obtain flight information from the first airlines. Operation 1391 contacts second airlines, using a company identity, to obtain flight information from the second airlines. Operation 1392 processes flight information from the first and second airlines.

In some embodiments, the present invention discloses methods and systems for coupling multiple identities when searching for airline itineraries. The multiple identities can include a company identity, which can be the identity of a company running an operation for assisting the customers in searching for airline itineraries. A platform, such as a server, can be used to represent the company, e.g., multiple individual customers can allow the platform to represent them in contacting the airlines.

The multiple identities can include individual identities, which can be the identities of the customers. A user account can be used to represent a customer. For example, a customer can log in the platform account using the user account, e.g., using the customer individual identity, and then using the user account to contact the airlines. The customer can contact the airlines, or the platform can contact the airlines, using the customer information.

In some embodiments, a number of airlines can participate in a system, such as a GDS system, or can be accessed using protocol standards, such as NDC standards or API standards. These airlines can be contacted using a corporation identity. For example, accessing a GDS system, for contacting airlines that participate in the GDS system, can only be provided to companies that have applied and achieved permission to access the GDS system. Contacting airlines using NDC protocols can normally be performed by companies that can prepare a platform having NDC protocol communication. Thus, a company identity can be used to access these airlines.

In some embodiments, a number of airlines do not want to participate in a system, such as low cost airlines, which prefer to interact with individual customers, for example, to reduce the overhead cost associated with the system. These airlines can be contacted using a personal identity, for example, by using a mobile device to contact the airline websites through a browser.

Figure 14A:
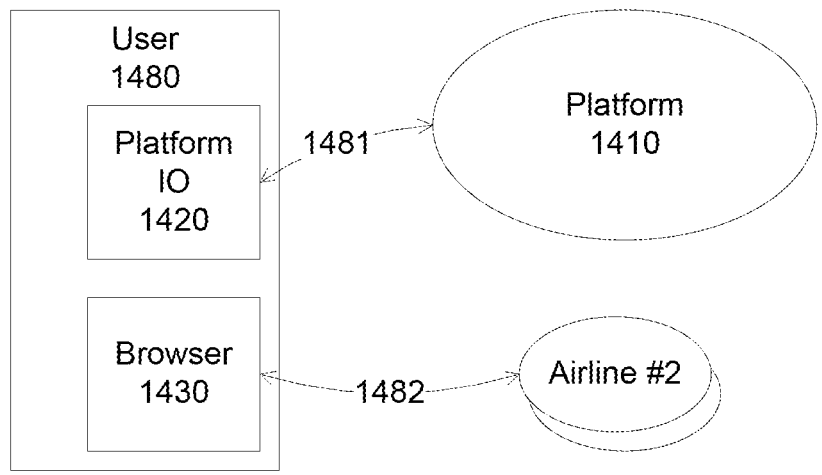
FIGS. 14A-14B illustrate a configuration for identity coupling according to some embodiments.
Figure 14B:
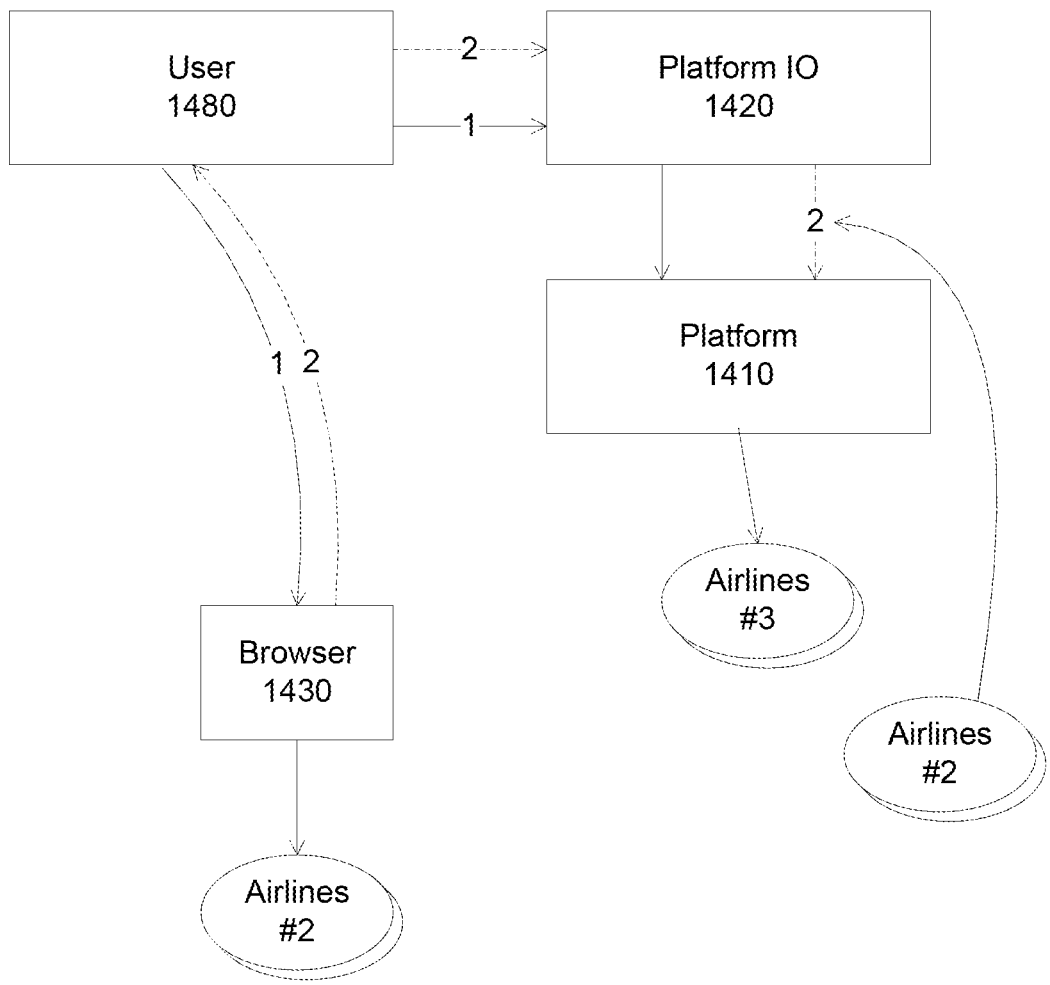

FIGS. 14A-14B illustrate a configuration for identity coupling according to some embodiments. The customer can query a company platform, for example, through a platform IO, for information of airlines, such as airlines participating in GDS system, or airlines using NDC protocols. A customer can directly contact other airlines, for example, contacting an airline website through a browser. The airline information can pass through the platform for consolidation before reporting to the customer.

In FIG. 14A, a user equipment 1480, such as a computer or a mobile phone, can include a platform IO 1420 for contacting 1481 a platform 1410. The platform can represent a company, and can be connected to a GDS system, which can have accesses to airlines that participate in the GDS system. The platform can be configured to have NDC protocol communication, thus can have accesses to airlines using the NDC protocols. The platform can be configured to have API protocol communication, thus can have accesses to airlines using the API protocols. The user equipment 1480 can include a browser application 1430 for contacting 1482 individual airlines, e.g., through the airline websites. Thus the user equipment 1480 can be configured to access airlines using an individual identity, e.g., when contacting airlines through the browser. The user equipment 1480 can be configured to access airlines using a corporate identity, e.g., when contacting airlines through the platform.

In FIG. 14B, a user can contact 1 a browser 1430 and a platform IO 1420 for connecting to a platform 1410. Through the browser, the user can access information from airlines #2. The platform can access information from airlines #3. Data from the browser can pass 2 through the user back to the platform, thus the platform can consolidate information from airlines #2 and #3, e.g., airline information that were collected by the user and by the platform.

In some embodiments, the airline information can be passed from the platform to the user for consolidation. Thus all collected airline information can be sent to the user, both from the browser and from the platform.

Figure 15:
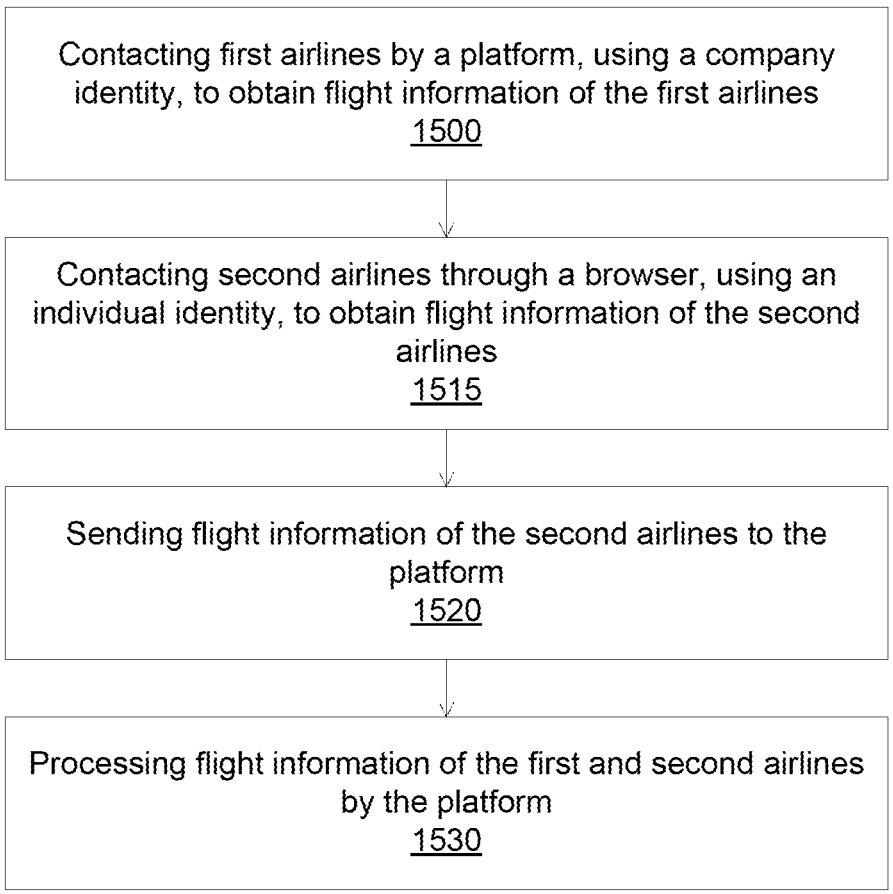
FIG. 15 shows a flow chart for identity coupling according to some embodiments.

FIG. 15 shows a flow chart for identity coupling according to some embodiments. Operation 1500 contacts first airlines by a platform, using a company identity, to obtain flight information of the first airlines. Operation 1510 contacts second airlines through a browser, using an individual identity, to obtain flight information of the second airlines. Operation 1520 sends flight information of the second airlines to the platform. Operation 1530 processes flight information of the first and second airlines by the platform.

Figure 16A:
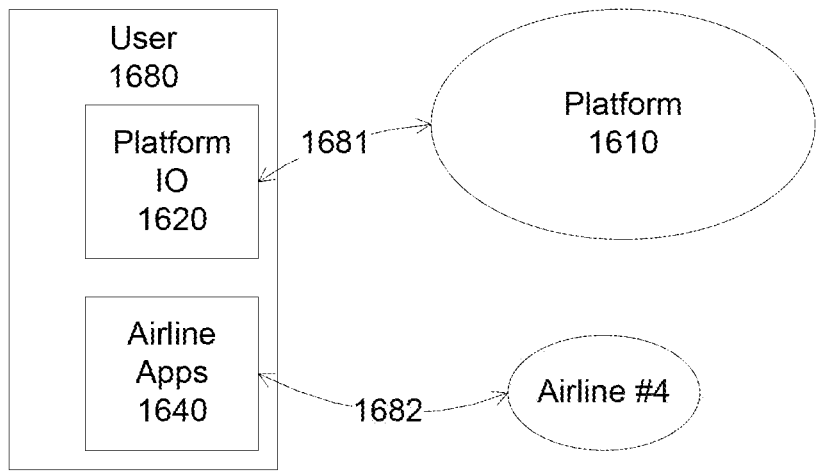
FIGS. 16A-16B illustrate a configuration for identity coupling according to some embodiments.
Figure 16B:
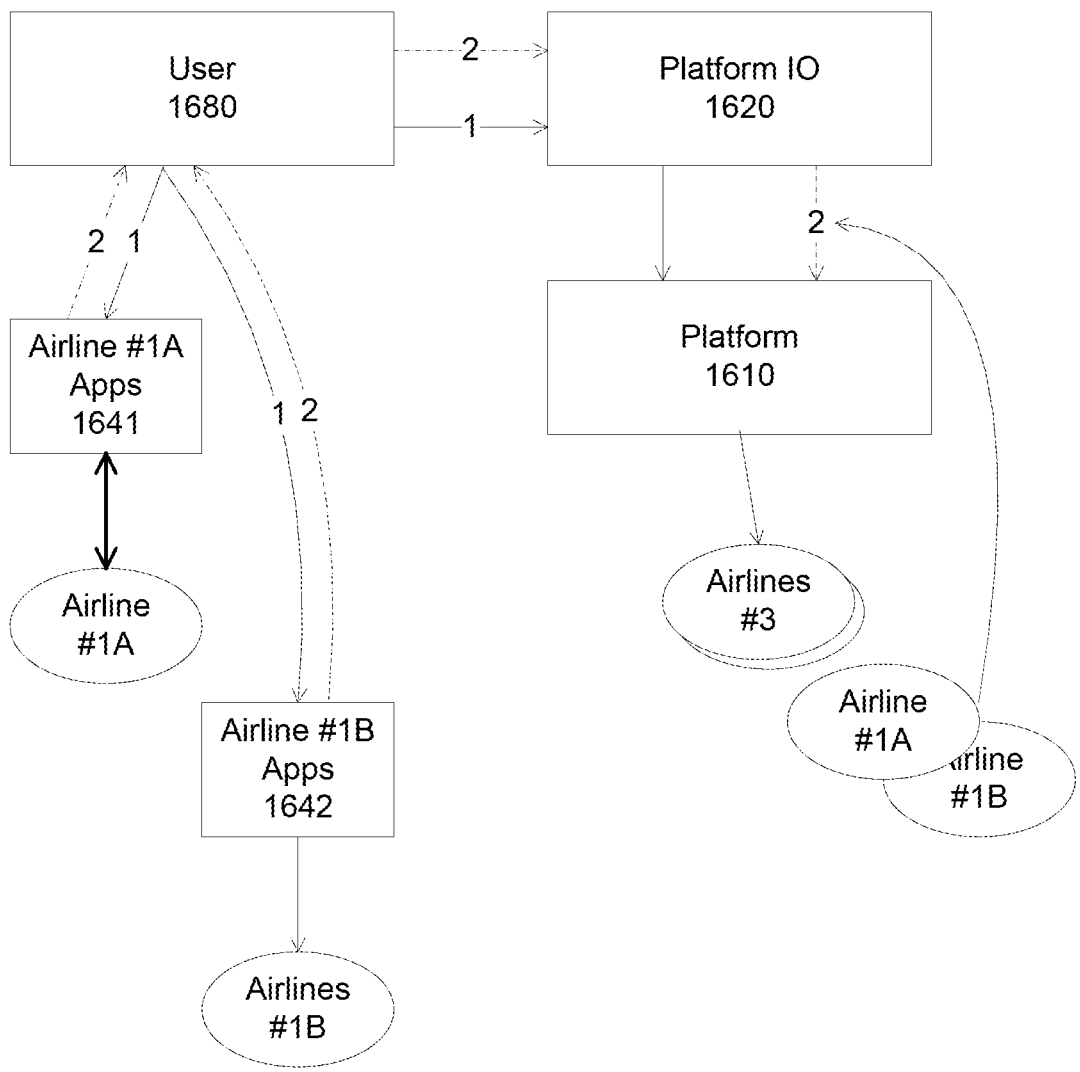

FIGS. 16A-16B illustrate a configuration for identity coupling according to some embodiments. The customer can query a company platform, for example, through a platform IO, for information of airlines, such as airlines participating in GDS system, or airlines using NDC protocols. A customer can directly contact other airlines, for example, contacting an airline through the airline application. The airline information can pass through the platform for consolidation before reporting to the customer.

In FIG. 16A, a user equipment 1680, such as a computer or a mobile phone, can include a platform IO 1620 for contacting 1681 a platform 1610. The user equipment 1680 can include one or more airline applications 1640 for contacting 1682 individual airlines, e.g., through the airline applications. The airline applications already have the user identification, thus using the airline applications can be similar to use a browser to access airline websites, together with providing all user credentials to the airlines. Multiple airline applications can be used, with each airline application specific to an airline. Thus the user equipment 1680 can be configured to access airlines using an individual identity, e.g., when contacting airlines through the airline application. The user equipment 1680 can be configured to access airlines using a corporate identity, e.g., when contacting airlines through the platform.

In FIG. 16B, a user can contact 1 one or more airlines through corresponded airline applications 1641/1642. The user can contact a platform IO 1620 for connecting to a platform 1610. Through the airline applications, the user can access information from airlines #1A and #1B. The platform can access information from airlines #3. Data from the airline applications can pass 2 through the user back to the platform, thus the platform can consolidate information from airlines #1A, #1B and #3, e.g., airline information that were collected by the user and by the platform.

In some embodiments, the airline information can be passed from the platform to the user for consolidation. Thus all collected airline information can be sent to the user, both from the airline applications and from the platform.

Figure 17:
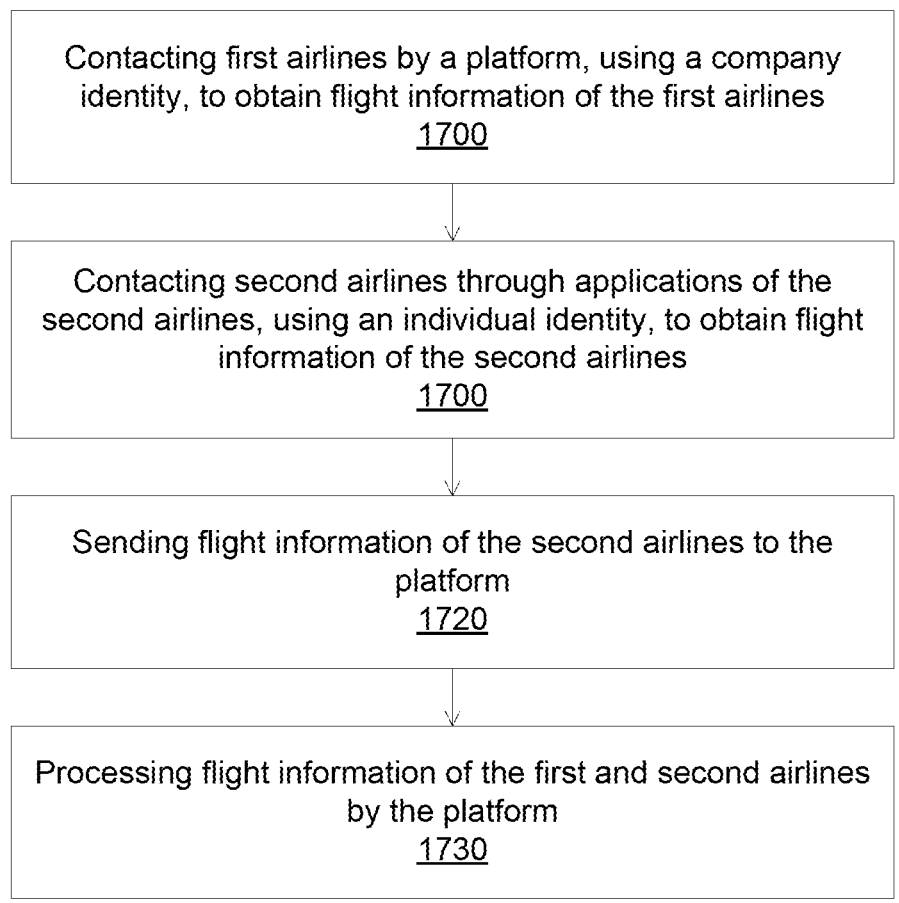
FIG. 17 shows a flow chart for identity coupling according to some embodiments.

FIG. 17 shows a flow chart for identity coupling according to some embodiments. Operation 1700 contacts first airlines by a platform, using a company identity, to obtain flight information of the first airlines. Operation 1710 contacts second airlines through applications of the second airlines, using an individual identity, to obtain flight information of the second airlines. Operation 1720 sends flight information of the first airlines (in the chart it says second airlines) to the platform. Operation 1730 processes flight information of the first and second airlines by the platform.

In some embodiments, the present invention discloses methods of coupling identities, using a corporate identity to access an airline application. The methods can use two identities for accessing two different types of airlines. A corporate identity can be used to access a first type, which includes airlines participating in GDS system and airlines incorporating NDC protocols. An individual identity can be used to access a second type of airlines, which includes airlines not participating in GDS system and not incorporating NDC protocols, including low cost airlines that manage their own sale distribution systems, such as having websites and applications in customer mobile devices.

In some embodiments, the present invention discloses methods to use a corporate platform for accessing both types of airlines. The platform can use the corporate identity to access airlines participating in GDS system and airlines incorporating NDC protocols. For example, the platform can include a corporation identification, so can access these airlines using this identification.

The platform can use a customer identity to access airlines not participating in GDS system and not incorporating NDC protocols. For example, a customer can sign in to the platform, implicitly or explicitly allowing the platform to represent him in contacting the airlines. The platform then can take over, e.g., using the customer identity, to contact the airlines that prefer to deal with the individual customers. In the case of a browser, the platform can start the browser, and use the customer identification and preferences to access the websites of the airlines. In the case of airline applications, the platform can run the applications, representing the customer when contacting the airlines.

Figure 18A:
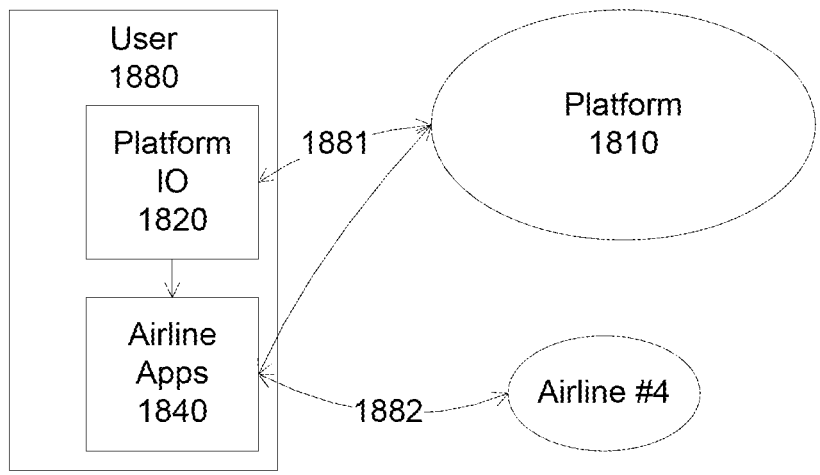
FIGS. 18A-18B illustrate a configuration for identity coupling according to some embodiments.
Figure 18B:
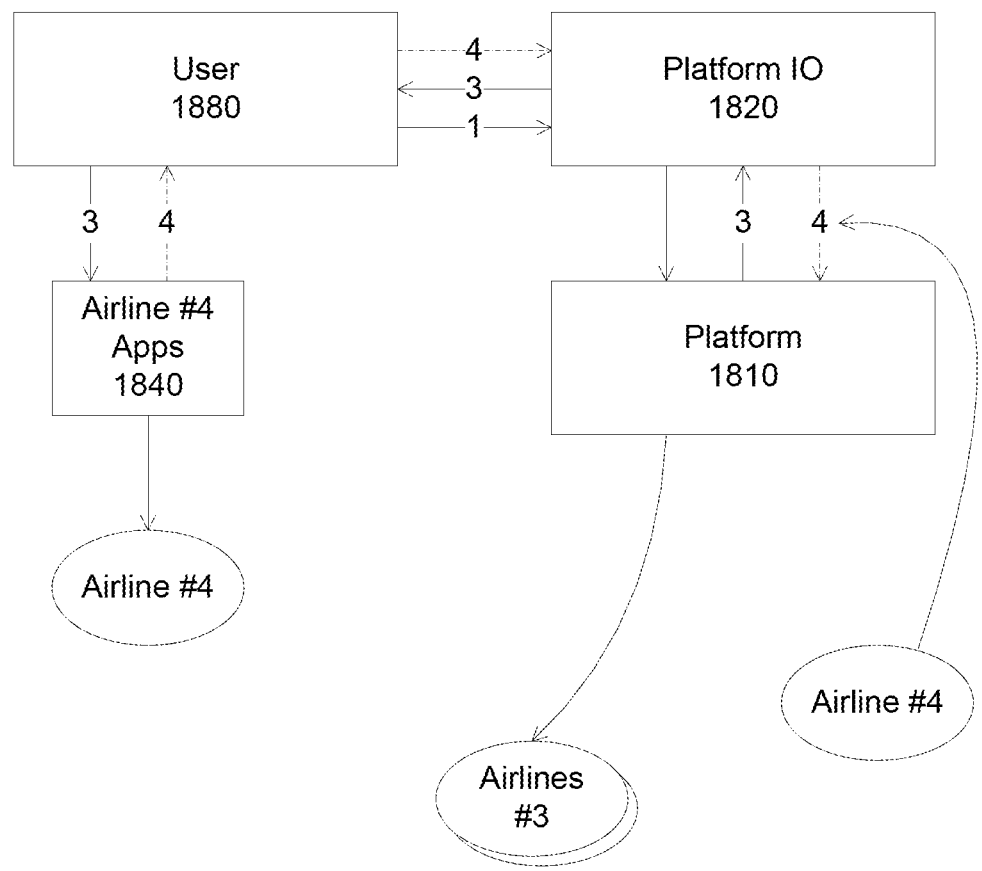

FIGS. 18A-18B illustrate a configuration for identity coupling according to some embodiments. The customer can contact a company platform, for example, through a platform IO, for airline information. The platform can access airline information through the airline application, using the user identity.

In FIG. 18A, a user equipment 1880, such as a computer or a mobile phone, can include a platform IO 1820 for contacting 1881 a platform 1810. The user equipment 1880 can include a browser for contacting airline websites. The user equipment 1880 can include one or more airline applications 1840 for contacting 1882 individual airlines, e.g., through the airline applications. The airline applications already have the user identification, thus using the airline applications can be similar to use a browser to access airline websites, together with providing all user credentials to the airlines. Multiple airline applications can be used, with each airline application specific to an airline. The applications and/or the browser can be configured to accept control through the platform, e.g., directly from the platform or from the platform IO.

In FIG. 18B, a user can contact 1 a platform 1810 through a platform IO 1820. The platform can use a corporate identity to access airlines, such as airlines #3. The platform can indirectly access 3 the airline applications 1840 to contact the airline #4. For example, the platform can go through the user 1880 to access the airline application 1840. In some embodiments, the user can log in 1 the platform, and then the platform can use the credential of the user to access 3 the airline application, for contacting airlines that prefer to deal with individual customers. Airline information collected from the airline application, such as information from airline #4, can be transferred 4 to the platform, to be consolidated with airline information that the platform has collected.

In some embodiments, the platform can access an airline through the airline website using a browser. The user credential can be supplied to the airline website to identify to the airline that the platform represents the customer, an individual and not a corporate identity.

Figure 19:
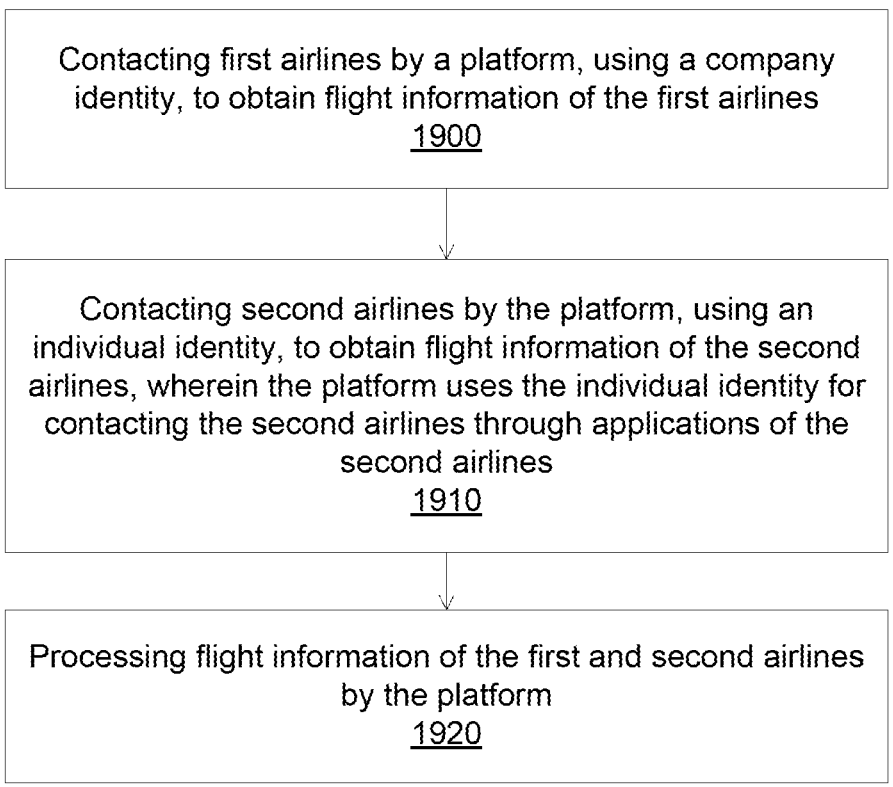
FIG. 19 shows a flow chart for identity coupling according to some embodiments.

FIG. 19 shows a flow chart for identity coupling according to some embodiments. Operation 1900 contacts first airlines by a platform, using a company identity, to obtain flight information of the first airlines. Operation 1910 contacts second airlines by the platform, using an individual identity, to obtain flight information of the second airlines, wherein the platform uses the individual identity for contacting the second airlines through applications of the second airlines. Operation 1920 processes flight information of the first and second airlines by the platform.

Figure 20:
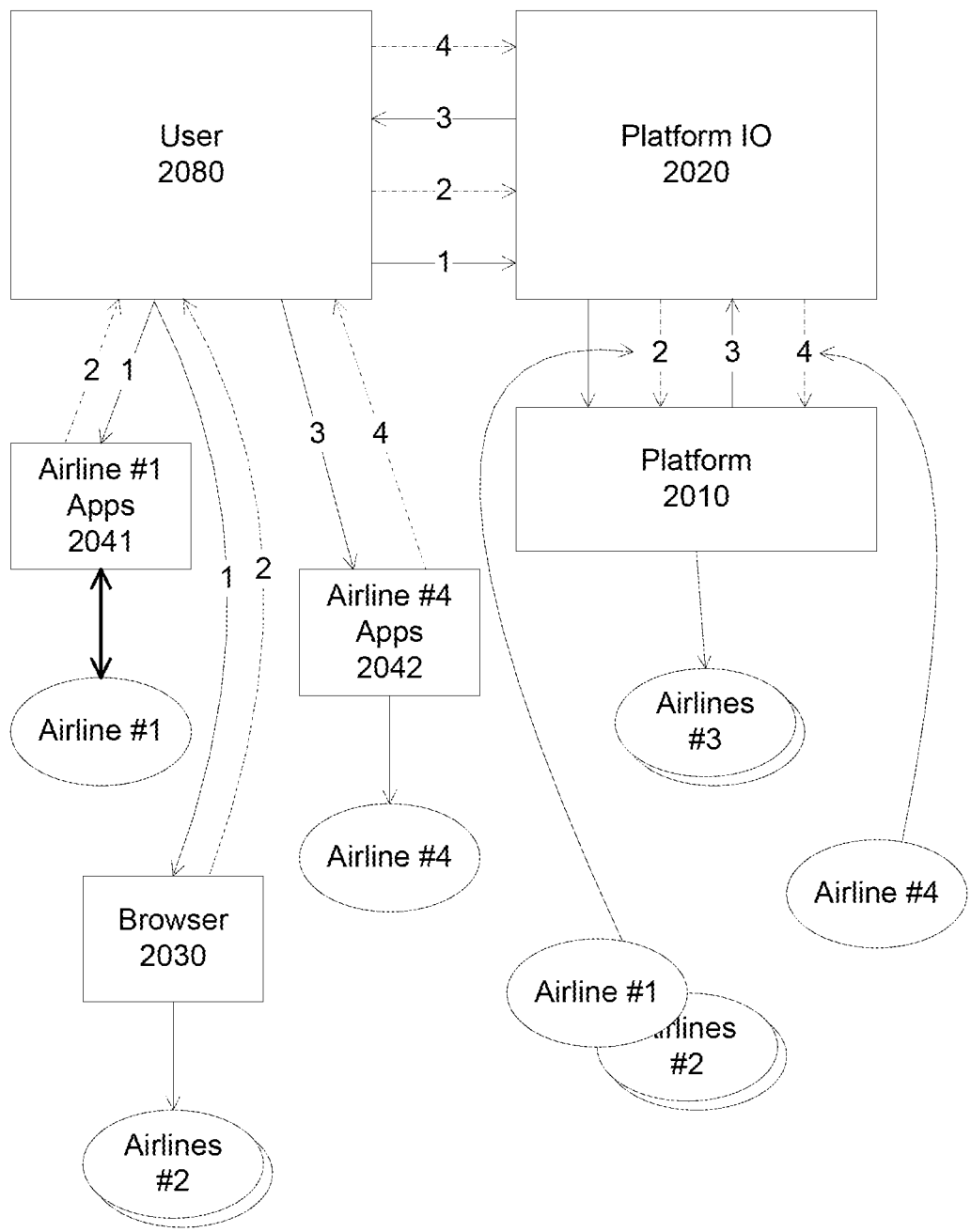
FIG. 20 illustrates a configuration for identity coupling according to some embodiments.

FIG. 20 illustrates a configuration for identity coupling according to some embodiments. The customer can contact airlines through a browser 2030 or through airline applications 2041. For example, airlines #2 can be accessed by the customer through the browser 2030. Airline #1 can be accessed through the airline application 2041. The information from these airlines, e.g., airlines #1 and #2, can be passed to the platform for consolidation.

The customer can contact a company platform 2010, for example, through a platform IO 2020, for airline information, such as airlines #3.

The platform can access airline information through the airline application, using the user identity. For example, the platform can access airline #4 through airline application 2042 using the customer identity.

Figure 21:
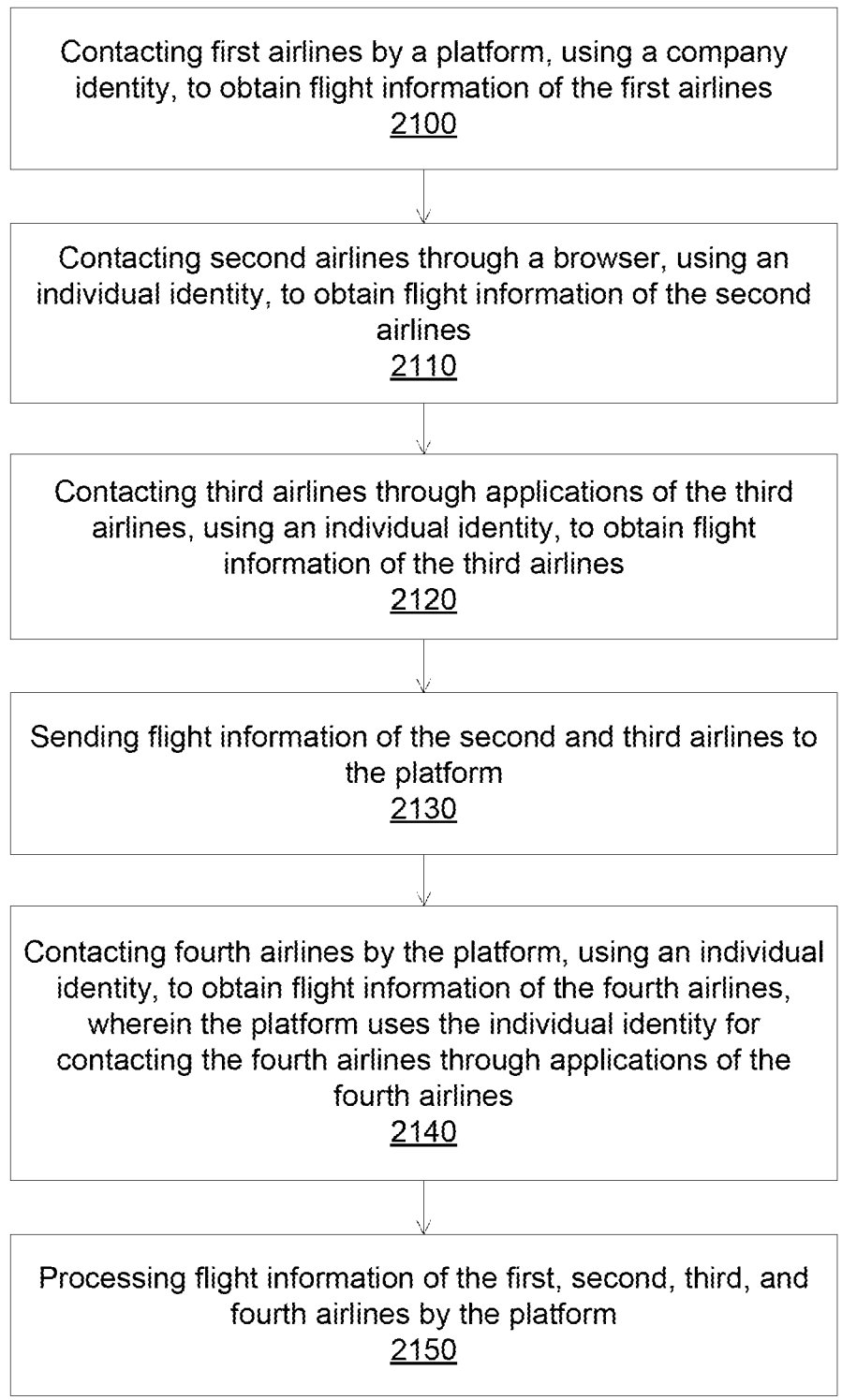
FIG. 21 shows a flow chart for identity coupling according to some embodiments.

FIG. 21 shows a flow chart for identity coupling according to some embodiments. Operation 2100 contacts first airlines by a platform, using a company identity, to obtain flight information of the first airlines. Operation 2110 contacts second airlines through a browser, using an individual identity, to obtain flight information of the second airlines. Operation 2120 contacts third airlines through applications of the third airlines, using an individual identity, to obtain flight information of the third airlines. Operation 2130 sends flight information of the second and third airlines to the platform. Operation 2140 contacts fourth airlines by the platform, using an individual identity, to obtain flight information of the fourth airlines, wherein the platform uses the individual identity for contacting the fourth airlines through applications of the fourth airlines. Operation 2150 processes flight information of the first, second, third, and fourth airlines by the platform.

In some embodiments, the present invention discloses a method for obtain flight itineraries from different airlines. The method can include using different identities to contact different airline entities.

For example, the method can include using a personal identity to contact airlines that cater to the individual consumers, such as low cost airlines having websites for customers to book flight itineraries. A platform can use a personal identity to contact individual airlines for obtaining the flight itineraries of the individual airlines that meet the requirements of the customer. The platform can use the customer identity to contact airlines that prefer to deal with individual customers. The contact can be made through the websites of the individual airlines. The personal identity can be the identification of the customer that contacts the platform to search for a flight itinerary. For example, the customer can establish an account with the platform, and provide personal and preference information to the platform. The customer can also allow the platform to represent the customer, e.g., using the customer identity, to contact vendors, such as sale agents and product provides. Thus a customer can log in to the platform, e.g., the platform can accept the log in credential from the customer. The platform then can use the customer credential as the personal identity.

The method can include using a corporate identity to contact an airline network or airlines that cater to the corporation. The airline network can include a computer reservation system that books and sells tickets for multiple airlines. For example, the airline network can include Global Distribution System (GDS), which is a network of airlines that can function to provide reservations for the airlines in the network. The airline network can include Abacus, Amadeus, KIU, Mercator, Navitaire, Radixx, Sabre, Travel Technology Interactive, TravelSky, and Travelport GDS. Access to GDS network can be by a corporation, e.g., individual consumers normally do not have access to GDS. Thus the platform can use a corporate identity to contact GDS and having access to the flight itineraries of the airlines participated in GDS. Individual airlines can also provide access to corporations, for example, through Application Programming Interface (API) or through New Distribution Capability (NDC) standards. Thus the platform can use a corporate identity to contact individual airlines through the airline API or by using NDC standards to access the flight itineraries of the airlines.

The flight itineraries obtained from the airlines and from the airline network using the personal and corporate identities can be grouped together to present to the customer looking for travel. The flight itineraries can be sorted according to a preference of the customer or according to price.

In some embodiments, the present invention discloses a method for obtain flight itineraries from different airlines. The method can include accepting a request for a first flight itinerary from a customer. For example, the customer can send the request to a platform, which can provide the customer with potential flight itineraries that meet the customer requirements. The requirements of the flight itinerary can include departure location, arrival location, and date of travel. The platform then can use a corporate identity to contact an airline network for obtaining flight itineraries from airlines in the airline network, wherein the flight itineraries satisfy conditions of the first flight itinerary. The platform then can use an identity of the customer to contact individual airlines for obtaining flight itineraries of the individual airlines, wherein the flight itineraries satisfy conditions of the first flight itinerary. Contact individual airlines can include contact one or more airlines through a website of each airline of the one or more airlines. The platform then can present the flight itineraries to the customer.

In some embodiments, provided is a machine readable storage, having stored there on a computer program having a plurality of code sections for causing a machine to perform the various steps and/or implement the components and/or structures disclosed herein. In some embodiments, the present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a solid state drive, a CD, a DVD, or a nonvolatile electronic memory. The software program may be run on a variety of devices, e.g. a processor on a data processing system.

In some embodiments, the methods can be realized in hardware, software, or a combination of hardware and software. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system, which includes a desktop computer, a laptop computer, a network computer, or a mobile device such as a cell phone, with a computer program that can control the computer system so that the computer system can perform the methods. The methods also can be embedded in a computer program product, which includes the features allowing the implementation of the methods, and which when loaded in a computer system, can perform the methods.

The terms "computer program", "software", "application", variants and/or combinations thereof, in the context of the present specification, mean any expression, in any language, code or notation, of a set of instructions intended to cause a system having an information processing capability to perform a particular function either directly or indirectly. The functions can include a conversion to another language, code or notation, or a reproduction in a different material form. For example, a computer program can include a subroutine, a function, a procedure, an object method, an object implementation, an executable application, an applet, a servlet, an app, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a processor and a graphical display monitor with a graphics screen for the display of graphical and textual information, and optional a keyboard for textual entry of information and a mouse for the entry of graphical data, and a computer processor. The keyboard and the mouse can be embedded in the graphical display monitor, e.g., in a touch screen monitor. In some embodiments, the computer processor can contain program code to implement the methods.

Other devices, such as a light pen (not shown), can be substituted for the mouse. This general purpose computer may be one of the many types well known in the art, such as a mainframe computer, a minicomputer, a workstation, a personal computer, or a mobile device such as a cell phone.

Figure 22:
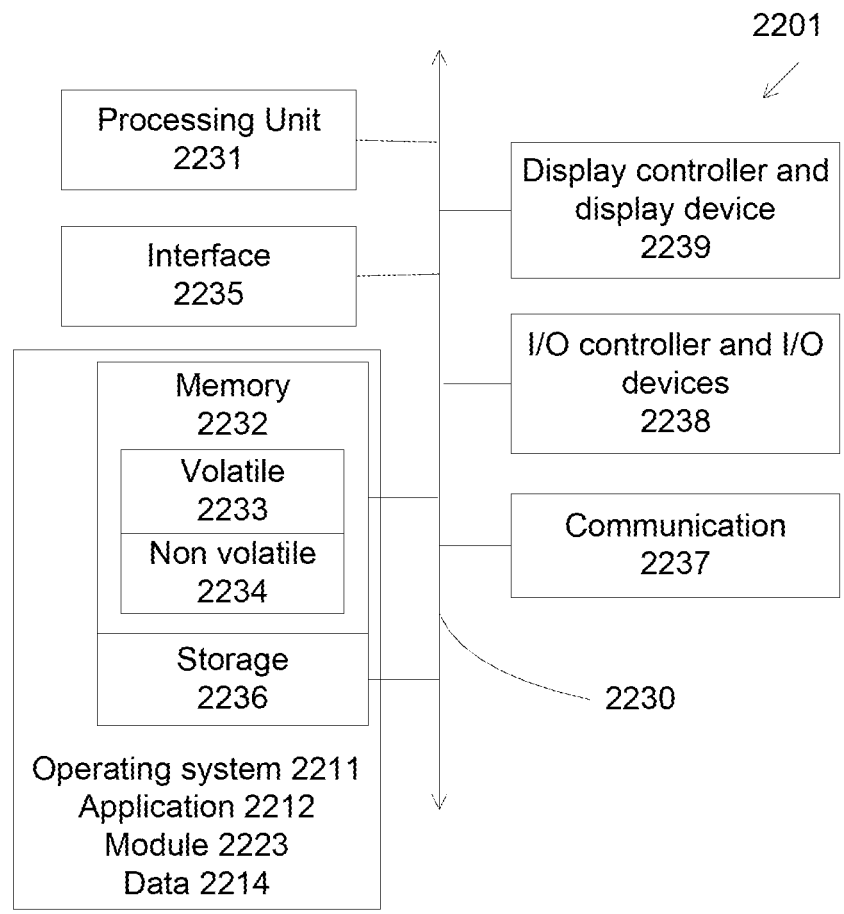
FIG. 22 illustrates a computing environment according to some embodiments.

FIG. 22 illustrates a computing environment according to some embodiments. An exemplary environment for implementing various aspects of the invention includes a computer 2201, comprising a processing unit 2231, a system memory 2232, and a system bus 2230. The processing unit 2231 can be any of various available processors, such as single microprocessor, dual microprocessors or other multi-processor architectures. The system bus 2230 can be any type of bus structures or architectures, such as 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCSI).

The system memory 2232 can include volatile memory 2233 and nonvolatile memory 2234. Nonvolatile memory 2234 can include read only memory (ROM), programmable ROM (PROM), electrically programmable ROM (EPROM), electrically erasable PROM (EEPROM), or flash memory. Volatile memory 2233, can include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 2201 also includes storage media 2236, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 2235 can be used to facilitate connection. These storage devices can be considered as part of the I/O device 2238 or at least they can be connected via the bus 2230. Storage devices that are "on board" generally include EEPROM used to store the BIOS.

The computer system 2201 further can include software to operate in the environment, such as an operating system 2211, system applications 2212, program modules 2213 and program data 2214, which are stored either in system memory 2232 or on disk storage 2236. Various operating systems or combinations of operating systems can be used.

Input devices can be used to enter commands or data, and can include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 2238. Interface ports 2238 can include a serial port, a parallel port, a game port, a universal serial bus (USB), and a 1394 bus. The interface ports 2238 can also accommodate output devices. For example, a USB port may be used to provide input to computer 2201 and to output information from computer 2201 to an output device. Output adapter 2239, such as video or sound cards, is provided to connect to some output devices such as monitors, speakers, and printers.

Computer 2201 can operate in a networked environment with remote computers. The remote computers, including a memory storage device, can be a personal computer, a server, a router, a network PC, a workstation, a microprocessor based appliance, a peer device or other common network node and the like, and typically includes many or all of the elements described relative to computer 2201. Remote computers can be connected to computer 2201 through a network interface 2235 and communication connection 2237, with wire or wireless connections. Network interface 2235 can be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 23:
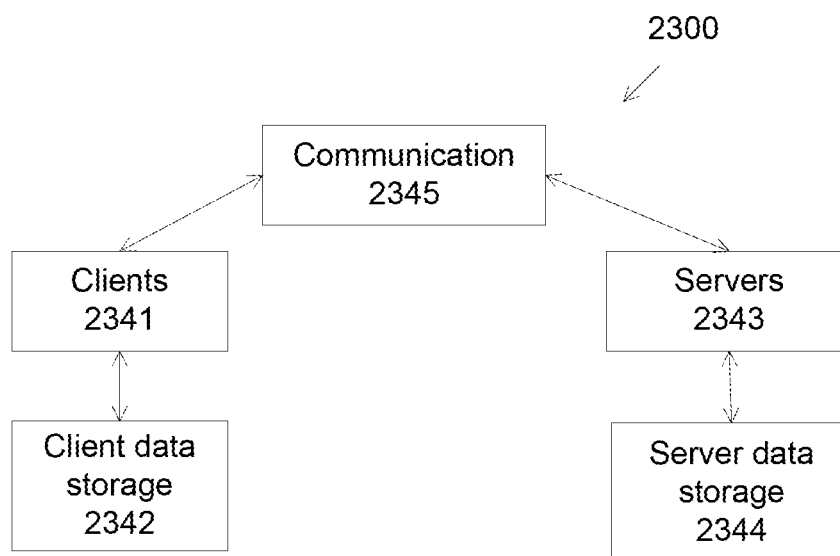
FIG. 23 is a schematic block diagram of a sample-computing environment with which the present invention can interact.

FIG. 23 is a schematic block diagram of a sample computing environment with which the present invention can interact. The system 2300 includes a plurality of client systems 2341. The system 2300 also includes a plurality of servers 2343. The servers 2343 can be used to employ the present invention. The system 2340 includes a communication network 2345 to facilitate communications between the clients 2341 and the servers 2343. Client data storage 2342, connected to client system 2341, can store information locally. Similarly, the server 2343 can include server data storages 2344.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A machine-implemented method comprising:
    searching, by a platform, prices for an air flight offered by airlines participating in Global Distribution Systems (GDS) network and by individual airlines,
    wherein the platform comprises at least two protocols selected from a list consisting of GDS protocol, New Distribution Capability (NDC) protocol, Internet protocol, and Application Program Interface (API) protocol,
    wherein the platform is configured to communicate with the airlines participating in GDS network using the GDS protocol, and
    wherein the platform is configured to communicate with the individual airlines using the NDC protocol, using the Internet protocol, or using the API protocol;
    negotiating with an airline of the individual airlines or of the airlines participating in the GDS network to obtain a matched price,
    wherein the negotiation occurs after obtaining the offered prices,
    wherein the matched price is compatible with a lowest price of the offered prices; and
    if the matched price is obtained, offering the matched price to the customer; otherwise, directing the customer to the individual airlines or of the airlines participating in the GDS network with the lowest price.

2. The method of claim 1, wherein the price offered by an airline of the individual airlines or of the airlines participating in the GDS network comprises airfare of the air flight and discount offerings for amenities or options from the airline.

3. The method of claim 1, further comprising:
    sorting the offered air flights based on a profile of a customer; and
    presenting the sorted air flights to the customer.

4. The method of claim 1, wherein the matched price offered by the airline includes discount offerings for amenities or options from the airline.

5. The method of claim 1, wherein the platform uses an identification of the customer when communicating with the airlines participating in the GDS network.

6. The method of claim 1, wherein the platform uses a corporate identification when communicating with the individual airlines.

7. The method of claim 1, further comprising:
    when the customer accepts the matched price, directing the customer to the airline having the accepted price, or representing the airline having the accepted price to sell the air flight to the customer.

8. A machine implemented method comprising:
    searching, by a platform, prices for an air flight offered by airlines participating in Global Distribution Systems (GDS) network and by individual airlines,
    wherein the platform comprises at least two protocols selected from a list consisting of GDS protocol, New Distribution Capability (NDC) protocol, Internet protocol, and Application Program Interface (API) protocol,
    wherein the platform is configured to communicate with first airlines of the individual airlines configured with NDC protocol using the NDC protocol, and
    wherein at least one of:
        the platform is configured to communicate with the airlines participating in GDS network using the GDS protocol,
        the platform is configured to communicate with second airlines of the individual airlines configured with Internet protocol using the Internet protocol, or
        the platform is configured to communicate with third airlines of the individual airlines configured with API protocol using the API protocol;
    negotiating with an airline of the individual airlines or of the airlines participating in the GDS network to obtain a matched price,
    wherein the negotiation occurs after obtaining the offered prices,
    wherein the matched price is compatible with a lowest price of the offered prices; and
    if the matched price is obtained, offering the matched price to the customer; otherwise, directing the customer to the individual airlines or of the airlines participating in the GDS network with the lowest price.

9. The method of claim 8, wherein the price offered by an airline of the individual airlines or of the airlines participating in the GDS network comprises airfare of the air flight and discount offerings for amenities or options from the airline.

10. The method of claim 8, further comprising:
    sorting the offered air flights based on a profile of a customer; and
    presenting the sorted air flights to the customer.

11. The method of claim 8, wherein the matched price offered by the airline includes discount offerings for amenities or options from the airline.

12. The method of claim 8, wherein the platform uses an identification of the customer when communicating with the airlines participating in the GDS network.

13. The method of claim 8, wherein the platform uses a corporate identification when communicating with the individual airlines.

14. The method of claim 8, further comprising:
    when the customer accepts the matched price, directing the customer to the airline having the accepted price, or representing the airline having the accepted price to sell the air flight to the customer.

15. A machine-implemented method comprising:
    searching, by a platform, prices for an air flight offered by multiple airlines,
    wherein the platform comprises at least two protocols selected from a list consisting of GDS protocol to communicate with airlines participating in GDS network, New Distribution Capability (NDC) protocol to communicate with individual airlines configured with NDC protocol, Internet protocol to communicate with individual airlines configured with Internet protocol, and Application Program Interface (API) protocol to communicate with individual airlines configured with API protocol, and wherein the search comprises communicating with the multiple airlines using the at least two protocols;

negotiating with an airline of the individual airlines or of the airlines participating in the GDS network to obtain a matched price, wherein the negotiation occurs after obtaining the offered prices, wherein the matched price is compatible with a lowest price of the offered prices; and if the matched price is obtained, offering the matched price to the customer; otherwise, directing the customer to the individual airlines or of the airlines participating in the GDS network with the lowest price.

16. The method of claim 15, wherein the price offered by an airline of the individual airlines or of the airlines participating in the GDS network comprises airfare of the air flight and discount offerings for amenities or options from the airline.

17. The method of claim 15, wherein the matched price offered by the airline includes discount offerings for amenities or options from the airline.

18. The method of claim 15, wherein the platform uses an identification of the customer when communicating with the airlines participating in the GDS network, wherein the platform uses a corporate identification when communicating with the individual airlines.

19. The method of claim 15, further comprising:

sorting the offered air flights based on a profile of a customer; and presenting the sorted air flights to the customer.

20. The method of claim 15, further comprising:

when the customer accepts the matched price, directing the customer to the airline having the accepted price, or representing the airline having the accepted price to sell the air flight to the customer.

\* \* \* \* \*